(12) United States Patent
Yamagata et al.

(10) Patent No.: US 6,814,993 B2
(45) Date of Patent: Nov. 9, 2004

(54) METHOD FOR PRODUCING JUST FRESH-COOKED FOOD PRODUCTS AND PRODUCTION SYSTEM THEREFOR

(75) Inventors: Mineo Yamagata, Shimada (JP); Kazutaka Takahashi, Kawasaki (JP); Yasushi Naruto, Kawasaki (JP); Chifumi Kaga, Shimada (JP); Takayuki Gotou, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 36 days.

(21) Appl. No.: 09/985,374

(22) Filed: Nov. 2, 2001

(65) Prior Publication Data

US 2002/0106432 A1 Aug. 8, 2002

Related U.S. Application Data

(63) Continuation-in-part of application No. 09/661,040, filed on Sep. 13, 2000, now abandoned.

(30) Foreign Application Priority Data

Sep. 14, 1999 (JP) ............................................ 11-261288
Jul. 10, 2000 (JP) ....................................... 2000-208429
Mar. 14, 2001 (JP) ....................................... 2001-072848

(51) Int. Cl.$^7$ ............................. A21D 8/02; A21D 6/00
(52) U.S. Cl. ....................................... 426/391; 426/496
(58) Field of Search ............................ 426/19, 61, 549, 426/551, 391, 393, 496, 502, 504, 505

(56) References Cited

U.S. PATENT DOCUMENTS

| | | | | |
|---|---|---|---|---|
| 5,385,742 A | * | 1/1995 | Van Eijk | 426/19 |
| 5,463,940 A | * | 11/1995 | Cataldo | 99/476 |
| 5,595,773 A | * | 1/1997 | Wada et al. | 426/20 |

FOREIGN PATENT DOCUMENTS

| | | |
|---|---|---|
| JP | 02-023462 | 1/1990 |
| JP | 03-178756 | 8/1991 |
| JP | 11-296748 | 10/1999 |
| JP | 2000-348261 | 12/2000 |

* cited by examiner

*Primary Examiner*—Keith Hendricks
(74) *Attorney, Agent, or Firm*—Oblon, Spivak, McClelland, Maier & Neustadt, P.C.

(57) ABSTRACT

A system and method for planning all of the operations in a kitchen on the basis of estimated sale data and actual sale outcome data (sale situation). The system and method provides workers with detailed instructions about each cooking operation, such as its starting and finishing time, so that fresh-cooked food product of a needed type may be supplied at a needed volume on an as needed basis through works as simple as possible by general workers of a minimum number in a simple fashion so as to satisfy the demand of customers or the demand for the product.

5 Claims, 17 Drawing Sheets

PANNING
PERSON IN CHARGE FOR MOLDING OR SHAPING
STARTING TIME : 18:27:00
FINISHING TIME : 18:32:30
STARTING TIME FOR THAWING : 05:30:00

FACILITIES : FREEZING CHAMBER → REFRIGERATING CHAMBER 1
PRESETTING OF FACILITIES : NO

| CHECK | CATEGORY | KIND OF PRODUCTS | RACK TIME | HALF SIZE (BS) | | HALF SIZE BS | | TOTAL PIECES |
|---|---|---|---|---|---|---|---|---|
| | | | | PIECES/BS | NUMBERS | PIECES/BS | NUMBERS | |
| | PULLMAN & WHITE BREAD | BRIOCHE de NANTERRE | 3 | 8 | 5 | 0 | 0 | 40 |
| | TOPPED AND BAKED | PIZZA (EGGPLANT & MUSHROOM) | 3 | 8 | 1 | 4 | 0 | 8 |
| | TOPPED AND BAKED | PIZZA (MIX) | 3 | 18 | 0 | 6 | 2 | 12 |
| | PULLMAN & WHITE BREAD | DANISH BREAD | 3 | 8 | 3 | 0 | 0 | 24 |
| | | TOTAL | | | 9 | | 2 | 84 |

FIG. 3A

PERSON IN CHARGE FOR MOLDING OR SHAPING
STARTING TIME : 18:32:30
FINISHING TIME : 18:35:30
STARTING TIME FOR THAWING : 10:00:00

FACILITIES : FREEZING CHAMBER → REFRIGERATING CHAMBER 2
PRESETTING OF FACILITIES : NO

| CHECK | CATEGORY | KIND OF PRODUCTS | RACK TIME | HALF SIZE (BS) | | HALF SIZE BS | | TOTAL PIECES |
|---|---|---|---|---|---|---|---|---|
| | | | | PIECES/BS | NUMBERS | PIECES/BS | NUMBERS | |
| | PULLMAN & WHITE BREAD | BRIOCHE de NANTERRE | 3 | 8 | 3 | 0 | 0 | 24 |
| | TOPPED AND BAKED | PIZZA (EGGPLANT & MUSHROOM) | 3 | 8 | 0 | 4 | 1 | 4 |
| | TOPPED AND BAKED | PIZZA (MIX) | 3 | 18 | 0 | 6 | 1 | 6 |
| | PULLMAN & WHITE BREAD | DANISH BREAD | 3 | 8 | 1 | 0 | 0 | 8 |
| | | TOTAL | | | 4 | | 2 | 42 |

FIG. 3B

BAKING
PERSON IN CHARGE FOR BAKING
PRE-OVEN STARTING TIME : 08:30:00
STARTING TIME FOR BAKING : 08:33:00
STEAM : 5 SECONDS

FACILITIES : UPPER BAKING SHEET (BS)

| CHECK | CATEGORY | KIND OF PRODUCTS | RACK TIME | BAKING INSTRUCTION | BS | | HALF SIZE BS | | | BAKING TIME | LOCATION |
|---|---|---|---|---|---|---|---|---|---|---|---|
| | | | | | NUMBERS | TYPE | NUMBERS | TYPE | | | |
| | HARD BREAD & SMALL BUNS | KAISER SEMMEL | 5 | KAISER | 0 | BS | 1 | 1/2BS | 19 | |
| | HARD BREAD & SMALL BUNS | CAMEMBERT CHEESE | 5 | CAMEMBERT | 0 | BS | 1 | 1/2BS | 19 | |

FIG. 4A

PERSON IN CHARGE FOR BAKING
PRE-OVEN STARTING TIME : 08:42:00
STARTING TIME FOR BAKING : 08:45:00

FACILITIES : FRYER

| CHECK | CATEGORY | KIND OF PRODUCTS | RACK TIME | BAKING INSTRUCTION | BS | | HALF SIZE BS | | | BAKING TIME | LOCATION |
|---|---|---|---|---|---|---|---|---|---|---|---|
| | | | | | NUMBERS | TYPE | NUMBERS | TYPE | | | |
| | DOUGHNUTS | BEAN JAM DOUGHNUT | 5 | AN-DOU | 0 | BS | 2 | 1/2BS | 3 | |

FIG. 4B

<2001/02/06> PERSON IN CHARGE OF MOLDING

MOLDING
THE STARTING TIME OF FINAL PROOFING: 08:31        FINAL PROOFING (1) →
FACILITIES: THAWING CHAMBER (1)

| CHECK | KIND OF PRODUCTS | MOLD, NUMBER | TYPE OF MOLD | NUMBER OF THE PIECES OF DOUGH | TIME FOR FINAL PROOFING |
|---|---|---|---|---|---|
|  | ENGLISH BREAD | 4 | BREAD PAN (36cm x12.5cm x 12.5cm) | 24 | 90 |

*FIG. 8A*

MOLDING
THE STARTING TIME OF FINAL PROOFING: 09:04        FINAL PROOFING (1) →
FACILITIES: THAWING CHAMBER (1)

| CHECK | KIND OF PRODUCTS | MOLD, NUMBER | TYPE OF MOLD | NUMBER OF THE PIECES OF DOUGH | TIME FOR FINAL PROOFING |
|---|---|---|---|---|---|
|  | FICELLE OLD FASHION | 3 | * ON THE PLEATED TOWEL | 6 | 60 |

*FIG. 8B*

MOLDING
THE STARTING TIME OF FINAL PROOFING: 09:14        FINAL PROOFING (1) →
FACILITIES: THAWING CHAMBER (1)

| CHECK | KIND OF PRODUCTS | MOLD, NUMBER | TYPE OF MOLD | NUMBER OF THE PIECES OF DOUGH | TIME FOR FINAL PROOFING |
|---|---|---|---|---|---|
|  | GARLIC-FRANCE | 5 | * ON THE PLEATED TOWEL | 5 | 50 |

*FIG. 8C*

* ON THE PLEATED TOWEL: PLACE THE SHAPED FICELLES ON THE PLEATED AND FLOURED TEA-TOWEL TO RISE UNTIL DESIRED SIZE AFTER FINAL-PROOFING

FIG. 8D

MOLDING

THE STARTING TIME OF FINAL PROOFING: 09:31
FACILITIES: THAWING CHAMBER (1) → FINAL PROOFING (1)

| CHECK | KIND OF PRODUCTS | MOLD, NUMBER | TYPE OF MOLD | NUMBER OF THE PIECES OF DOUGH | TIME FOR FINAL PROOFING |
|---|---|---|---|---|---|
| | CALPIS BUTTER BREAD | 2 | BREAD PAN (24cm x12.5cm x 12.5cm) | 10 | 90 |
| | RAISIN-ENRICHED | 2 | 4 PIECES ON BS | 8 | 60 |

FIG. 8E

MOLDING

THE STARTING TIME OF FINAL PROOFING: 10:01
FACILITIES: THAWING CHAMBER (1) → FINAL PROOFING (1)

| CHECK | KIND OF PRODUCTS | MOLD, NUMBER | TYPE OF MOLD | NUMBER OF THE PIECES OF DOUGH | TIME FOR FINAL PROOFING |
|---|---|---|---|---|---|
| | PULLMAN AND WHITE BREAD | 4 | BREAD PAN (24cm x12.5cm x 12.5cm) | 32 | 60 |

FIG. 8F

MOLDING

THE STARTING TIME OF FINAL PROOFING: 10:31
FACILITIES: THAWING CHAMBER (1) → FINAL PROOFING (1)

| CHECK | KIND OF PRODUCTS | MOLD, NUMBER | TYPE OF MOLD | NUMBER OF THE PIECES OF DOUGH | TIME FOR FINAL PROOFING |
|---|---|---|---|---|---|
| | ENGLISH-BREAD | 2 | BREAD PAN (36cm x12.5cm x 12.5cm) | 12 | 90 |

<2001/02/06> OVEN WORKS
OVEN (UPPER & MIDDLE DECKS)

| CHECK | KIND OF PRODUCTS | RACKING TIME | BAKING INSTRUCTION | THE PRECEDING FACILITIES | NUMBER | KINDS OF MOLD |
|---|---|---|---|---|---|---|
| ◇ 11:00 ~ 12:00 | | | | | | |
| | CHOCOLATE-ALMOND | 2 | | DOUGH CONDITIONER 3 | 1 | BS |
| | CREAMY CHEESE | 2 | | DOUGH CONDITIONER 3 | 1 | BS |
| | MILKY FRANCE | 5 | | DOUGH CONDITIONER 3 | 1 | 1/2 BS |
| | VEGETABLE PIZZA | | | DOUGH CONDITIONER 3 | 1 | 1/2 BS |
| | POTATO-MAYONNAISE PIZZA WITH FISH-EGG | | | DOUGH CONDITIONER 3 | 1 | 1/2 BS |
| | CHEESE STICK | 2 | | DOUGH CONDITIONER 3 | 1 | BS |
| | GERMAN POTATO | | | DOUGH CONDITIONER 3 | 1 | 1/2 BS |
| | FRANK ROLL | 2 | | DOUGH CONDITIONER 3 | 1 | 1/2 BS |
| | MELON BUN | | SHIELD PLATE | DOUGH CONDITIONER 3 | 1 | 1/2 BS |
| | CORN ROLL | 2 | | DOUGH CONDITIONER 3 | 1 | 1/2 BS |
| | MELON BUN | | SHIELD PLATE | DOUGH CONDITIONER 3 | 1 | BS |
| | WHIPPED MELON | | SHIELD PLATE | DOUGH CONDITIONER 3 | 1 | BS |
| | HOKKAIDO OGURA-AN PAN | 2 | | DOUGH CONDITIONER 3 | 1 | 1/2 BS |
| | HOKKAIDO KOSHI-AN PAN | 2 | | | 1 | 1/2 BS |
| | CREAM BUN | 2 | | | 1 | 1/2 BS |
| | CASTARD CREAM PASTRY | | | DOUGH CONDITIONER 3 | 6 | 6-PORTION BS |
| | CHOCOLATE-NUT PASTRY | 2 | | DOUGH CONDITIONER 3 | 6 | 6-PORTION BS |
| ◇ 12:00 ~ 13:00 | | | | | | |
| | GARLIC-FRANCE | | STEAM | FINAL PROOFING 1 | 5 | * ON THE PLEATED TOWEL |
| | FICELLE OLD FASHION | | STEAM | FINAL PROOFING 1 | 3 | * ON THE PLEATED TOWEL |
| | MILKY FRANCE | | STEAM | DOUGH CONDITIONER 3 | 1 | BS |
| | CHOCOLATE-CHIP PIE | 15 | | REFRIGERATOR | 1 | 1/2 BS |
| | APPLE PIE | 2 | | REFRIGERATOR | 1 | 1/2 BS |

* ON THE PLEATED TOWEL: PLACE THE SHAPED FICELLES ON THE PLEATED AND FLOURED TEA-TOWEL TO RISE UNTIL DESIRED SIZE AFTER FINAL-PROOFING

*FIG. 9A*

OVEN (LOWER DECK)

| CHECK | KIND OF PRODUCTS | RACKING TIME | BAKING INSTRUCTION | THE PRECEDING FACILITIES | NUMBER | KINDS OF MOLD |
|---|---|---|---|---|---|---|
| ◇ 13:00 ~ 14:00 | | | | | | |
| | PULLMAN AND WHITE BREAD | | BLACK SEAL | FINAL PROOFING 1 | 4 | BREAD PAN (24cm x 12.5cm x 12.5cm) |
| | ENGLISH BREAD | | | FINAL PROOFING 1 | 2 | BREAD PAN (36cm x 12.5cm x 12.5cm) |

OVEN (UPPER & MIDDLE DECK)

| CHECK | KIND OF PRODUCTS | RACKING TIME | BAKING INSTRUCTION | THE PRECEDING FACILITIES | NUMBER | KINDS OF MOLD |
|---|---|---|---|---|---|---|
| ◇ 13:00 ~ 14:00 | | | | | | |
| | RAISIN-ENRICHED | | | FINAL PROOFING 1 | 1 | BS |

*FIG. 9B*

<2001/02/06> FRYER WORKS

| CHECK | KIND OF PRODUCTS | RACKING TIME | BAKING INSTRUCTION | THE PRECEDING FACILITIES | NUMBER | KINDS OF MOLD |
|---|---|---|---|---|---|---|
| ◇ 09:00~10:00 | | | | | | |
| | FRANK-DOUGHNUT | 15 | | DOUGH CONDITIONER 2 | 1 | BS |
| | WINTER SEASON CURRY DOUGHNUT | 15 | | DOUGH CONDITIONER 2 | 1 | BS |
| | CURRY FILLING DOUGHNUT | 15 | | DOUGH CONDITIONER 2 | 1 | BS |
| | EGG FILLING DOUGHNUT | | | REFRIGERATOR | 1 | 1/2 BS |
| | FRIED BALL | | | REFRIGERATOR | 1 | 1/2 BS |
| | WHIPPED CHOCO-CREAM DOUGHNUT | 15 | | DOUGH CONDITIONER 2 | 1 | BS |
| | CINNAMON BAGEL | 15 | | DOUGH CONDITIONER 2 | 1 | BS |
| | TWISTED DOUGHNUT | 15 | | DOUGH CONDITIONER 2 | 1 | BS |
| | BEAN JAM DOUGHNUT | 15 | | DOUGH CONDITIONER 2 | 1 | BS |

| CHECK | KIND OF PRODUCTS | RACKING TIME | BAKING INSTRUCTION | THE PRECEDING FACILITIES | NUMBER | KINDS OF MOLD |
|---|---|---|---|---|---|---|
| ◇ 11:00~12:00 | | | | | | |
| | BEAN JAM DOUGHNUT | 15 | | DOUGH CONDITIONER 3 | 1 | 1/2 BS |
| ◇ 12:00~13:00 | | | | | | |
| | EGG FILLING DOUGHNUT | | | REFRIGERATOR | 1 | 1/2 BS |

METHOD FOR PRODUCING JUST FRESH-COOKED FOOD PRODUCTS AND PRODUCTION SYSTEM THEREFOR

This application is a Continuation-in-Part of Ser. No. 09/661,040, filed Sep. 13, 2000, now abandoned.

BACKGROUND OF THE INVENTION

1. Field of the Invention

The present invention relates to a production system, program, a recording medium carrying the recorded program, a method for controlling the system in the production of just fresh-cooked food products and a method for producing just fresh-cooked food products.

2. Discussion of the Background

When it is intended to provide just fresh-cooked food products, the works in in-store kitchens are very labor-intensive. So as to provide a volume of a just fresh-cooked food product as just required on a needed basis, in particular, the food product is essentially prepared in a small portion at a high frequency; in case of a great number of bread types and daily dish types requiring complex cooking processes, the works therefor are so complicated and laborious that non-skillful workers can hardly perform such cooking processes. These products are so rapidly deteriorated or altered. Considerable times and labors are needed for such non-skillful workers to master the cooking and processing conditions therefor.

The time zone with a good product sale includes peaks at lunch time and dinner time, so that the kitchen works therefor correspondingly reach their peaks in such time zone. Thus, kitchen facilities are required to have capacities capable of simply coping with these peaks for cooking and processing in harmony with the time zone where consumers rush for such products. Additionally, the number of workers is also required to pass through the peaks.

Because the types and volumes of products to be sold differ, depending on each store and each store open day, furthermore, store managers have been likely to determine for example the types and numbers of products to be produced on the basis of their own unique judgment based on their experiences and instinct and to produce and process products by their own unique procedures and then arrange the resulting products on their store counters. Meanwhile, their kitchens are commonly apart from the stores. Hence, it is very difficult to catch what types of products consumers want to get on real-time basis.

Accordingly, products demanded from consumers are rarely arranged at needed volumes in store; additionally, the kitchen works are not leveled so the number of workers is more likely to be excess.

As the outcome thereof, each store is flooded with sale reduction and the increase of labor cost, so that the management of each store is under pressure.

The types of bakery products such as bread and doughnut and food products such as daily dishes are so numerous and are selected on dishes in an enjoyable manner.

It is well known that these bakery products comprising wheat flour as the principal ingredient and food products such as daily dishes are deteriorated or altered over time immediately after cooking, so that aging phenomena emerge therein. Although the deterioration of the quality is remarked, these products have been on market, despite the form of non-just fresh-cooked products regarded as preservable foods.

For producing just fresh-baked bread for example by scratch process comprising mixing wheat flour with other materials and baking bread dough through all the scratch steps, alternatively, the process requires 5 hours at minimum. Therefore, the preparing step should be in timing close to the time for meal as much as possible. For serving a wide variety of bread types and volumes just baked, the number of the individual steps such as preparing and baking and the timing thereof should be adjusted in a sophisticated fashion.

For the purpose of baking a wide variety of bread types in a simple and labor-saving manner, hence, a process using frozen dough has been proposed. In this case, a starting material frozen dough is thawed and taken out of final proofing chamber, which is then baked in oven.

For supplying genuinely fresh-cooked various bread types, however, complicated individual steps satisfying appropriate processing temperature and timing of each bread type are essentially demanded even in this case.

At baking step, for example, the oven preset temperature is generally changed depending on each bread type, because individual bread types traditionally require different baking temperature conditions. Due to the time required for temperature presetting, baking needs a longer time. For baking good bread, more specifically, the oven is already preset to given conditions just in timing for baking after the termination of bread dough proofing.

Meanwhile, bread dough should be placed in an oven after the dough is appropriately proofed and expanded at extents suitable for such bread type. Unless the state of dough taken out of final proofing chamber is satisfactory, high-quality bread can never be produced by baking. Nevertheless, proofing of bread dough so solely depends on yeast that bread dough is frequently at a state not appropriate for baking in oven just in needed timing. Thus, the preliminary step is to be on completion slightly before the needed timing; when the dough is satisfactorily proofed in final proofing chamber at a state suitable for baking, the dough is then placed in an oven for baking, even outside the time zone with a good bread sale. Because of such limitation from the respect of the processing steps, bread not just fresh-baked is actually in store, in spite of the label or advertisement "just fresh-baked".

In case that a needed volume of a bread type is preliminarily determined, undoubtedly, the volume of the bread dough to be prepared is calculated on the basis of the needed volume. When the estimated volume happens to differ from the actually needed volume due to the long duration of the preliminary bakery steps, it is more difficult to supply just fresh-baked bread. Furthermore, the estimate sometimes varies, depending on the influence of weather and the variation in the number of customers. Consequently, a considerably larger estimate than actual demand has generally been established, also involving the occurrence of loss.

In such circumstances as described above, any method and supply system for producing genuinely just fresh-baked bread have scarcely been examined.

Japanese Patent Application Laid-open No. 1991-241495 discloses an electric cash register apparatus which transmits a cooking instruction about a dish ordered by a guest to a cook in the food service industry. Its purpose is to make it possible to efficiently cook by controlling the timing of the cooking instruction. However, the request by the guest has to be first registered in the apparatus in each time. The cooking instruction actually means an instruction to the cook of the timing of starting the cooking, but no instruction with respect to the cooking processes thereafter will be especially made to the cook.

Japanese Patent Application Laid-open No. 1992-77959 discloses an automatic cooking control system for automating a cooking instruction in a kitchen after a waiter has received an order in the food service industry. Its purpose is to make the control of the cooking instruction in the kitchen appropriate and efficient. The cooking instruction means an instruction with an information-judging gadget to the cook of the timing of starting the cooking based on the contents of cooking. No instruction with respect to the cooking processes thereafter will be especially made to the cook.

Japanese Patent Application Laid-open No. 1994-139256 discloses an order control system for selecting a plural outputting apparatus installed in a kitchen on the basis of a time zone, the number of workers in the kitchen and the like and transmitting ordering data to the most appropriate apparatus. In the system, some conditions such as the numbers of the workers per business time have been preliminarily determined, and an apparatus to be used for outputting will be selected by judging to which condition the present condition shall belong.

Japanese Patent Application Laid-open No. 1996-242779 discloses an invention whose purpose is to control progress in the preparation of a dish and to provide a function of informing the finishing time of each cooking process so that the cooking may be done easily, accurately and efficiently. The invention requires a timer means for measuring a period from the starting to the finishing of each cooking process as an essential constituent, and is characterized by measuring the time required for at least one step in each cooking process with the timer means. Thus, this invention just instructs a recipe of cooking and the finishing time of the processes.

Japanese Patent Application Laid-open No. 1997-299017 discloses a vehicle for producing and selling breads in a mobile fashion, but the vehicle never overcomes the problems occurring due to the variation of the sale's volume and consumption volume of bread types. The vehicle can reduce the time required for the transfer of bread types to places to be consumed, but the vehicle has to bake and keep breads at volumes more than the estimates for sale. When the estimates differ from the actual volumes of sold breads, the difference between the estimated volume and the actual volume simply corresponds to a loss.

Japanese Patent Application Laid-open No. 1998-28563 discloses an apparatus for order-receiving, preparing and baking of hamburger, comprising a production-planning apparatus for calculating and instructing the number of patty and buns that are planned to be baked on the basis of actual order-receiving outcome data and estimation data in the future, an apparatus for baking patty and an apparatus for baking buns. The purpose of this invention is to rationalize a total working process from the receiving of the order of the hamburger to its finishing, and especially to shorten the time for waiting and to improve freshness of the products. The invention is characterized by that the patty and buns have been preliminarily baked and stored so as to shorten the waiting time of the hamburger. Since the actual order-receiving outcome data used in the above production-planning apparatus may be obtained by a direct order orally made by a customer, or outputted from an order-receiving apparatus on the basis of customer's inputting operation (page 4, the left column, 18–20 lines), the customer's inputting the data is definitely required. Since warming and combining of the patty and buns in the invention is a very simple and fixed working, it has not required any specialized technique or skill and any one can do it without difficulty.

Japanese Patent Application Laid-open No. 1999-14065 discloses a cooking-supporting system for optionally providing in an easily accessible form the information about cooking including an operation program of a cooking apparatus in response to a request by a consumer, and a cooking apparatus which is compatible with the above system. The cooking-supporting system comprises an information-providing means for recording information of each cooking and a plural information-controlling means. The information of each cooking includes the kinds and amounts of materials, their nutrition values, a method in each cooking step, and programs for the operations of cooking apparatuses such as a microwave oven and an electric rice cooker. The system is characterized by that the program is transmitted from the information-controlling means to the cooking apparatuses. Japanese Patent Application Laid-open No. 1999-15893 discloses a system for controlling of stocks and cooking, and a method for controlling of stocks and cooking. Their purpose is to provide a rapid service so as not to have guests wait depending on the cooking time. It is characterized by that the number of stock and cooking time of each product are input in advance and that when the number of the stocks of a product is decreased to a predetermined level an alarm will be rung so that an additional cooking of the product is requested to keep a constant level of the number of the stock. Accordingly, the alarm will only promote an addition of cooking, and the system can be effective only in a case where the cooking time is short and supplement of the stock will be easily made in response to an instruction of the addition of cooking.

Japanese Patent Application Laid-open No. 1999-187824 discloses a cooking-supporting system for controlling cooking operations by using the information about progress of cooking in accordance with an actual progress in the cooking, for outputting an appropriate cooking means in accordance with the progress of the cooking each time, and for effectively controlling various kinds of cooking apparatuses in connection with the cooking operations depending on various kinds of menus.

SUMMARY OF THE INVENTION

However, no prior art mentioned above describes a system or method for planning all of the operations in a kitchen on the basis of estimated sale data, actual sale outcome data (sale situation) and for providing workers with a detailed instruction of the information about each cooking operation such as its starting and finishing time.

It is a purpose of the invention to supply a just fresh-cooked food product of a needed type at a needed volume on a needed basis through works as simple as possible not by skillful experts but by general workers of a minimum number in a simple fashion, so as to satisfy the demand of customers or the demand for the product.

It is a purpose of the invention to elevate the frequency of baking bread dough or the frequency of oil cooking process of daily dishes for producing and supplying just fresh-baked bread and doughnuts or daily dishes, by simplifying the conventional complicated preliminary procedures of baking and/or oil cooking process and unifying such procedures concerning a diverse variety of products to simultaneously process them.

Additionally, it is a purpose of the invention to provide a system and method for producing just fresh-cooked food products.

Another purpose of the present invention is to a program for implementing or processing the above system with a computer, or to a program for making the computer operate or function as the above system, a recording medium that is readable or accessible for the computer, and use of the system in the method according to the present invention.

The invention relates to a method for producing and supplying just fresh-cooked food products, executing each process based on a job instruction describing the procedures of each process.

The method may be utilized for effectively applying a method for producing and supplying just fresh-baked bread and just fresh-fried doughnuts or just fresh-cooked daily dishes described in the present specification.

Particularly, the job instruction describes, for example, the contents of the works concerning the blending, baking and/or oil cooking of frozen dough, or the preliminary preparative process and other cooking process of daily dishes, which have been made on the basis of actual production (generation) outcome data, and estimated sale data designed based on the past actual sale outcome data and modified on request on the basis of a day's actual sale outcome data with a computer at least once a day.

Additionally, a more simplified form of the method comprises using the estimated sale data designed based on the past sale outcome data as it is with no modification on the basis of the day's actual sale outcome data with a computer on occasion.

The job instruction is prepared on request at least once a day, and may be outputted by an appropriate means for outputting such as a means for displaying on a computer display, or an appropriate means for outputting in the form of document or voice.

The job instruction may be prepared at an appropriate interval of time from the respects of the abilities and skills of workers. Thus, the interval of the preparation, display and/or output of such contents of the works is desirably as short as possible, so as to enable the production to more sufficiently cope with the demand. When the interval is too short, however, workers are then under too much of a load. Therefore, the actual interval of time may be optionally changed depending on the demand and the like, or alternatively may be the same (e.g., 30 min) throughout the working hours of the day.

The following examples depict examples of such system.

First, a sale estimation system is provided, comprising a means for inputting estimated sale data (sale plan number) designed based on the past actual sale outcome, a means for recording and/or controlling the estimated sale data. The sale estimation system may further comprise at least one of a means for inputting the actual sale outcome data, a means for recording the actual sale outcome data, a means for recording a given rule; and a means for reading the estimated sale data, the actual sale outcome data and the rule and modifying the estimated sale data under the rule on the basis of the actual sale outcome data The sale estimation system includes a means functioning as a central processing unit, which on instruction from a control program in a main memory may read the estimated sale data and the actual sale outcome data from each recording means, and modify on request the estimated sale data under the given rule on the basis of the actual sale outcome data at least once a day. The modified estimated sale data will be recorded again in the means for recording and/or controlling the estimated sale data.

The "rule" means that based on the comparison between the accumulated number (actual sale outcome data) of each merchandise sold at each periodical point and the estimated sale data (in number) and the calculation of a progress ratio (sale ratio) of the sale of each merchandise based on the resulting ratio, the subsequent estimated sale data may be appropriately modified on request by multiplication of the estimated sale data thereafter with a coefficient corresponding to the progress ratio. The "rule" may be also called "standard master for determining the increase or decrease." Herein, the coefficient may preliminarily be determined appropriately per each product or merchandise.

The estimated sale data include for example monthly sale or rough (gross) profit, weekly sale or rough (gross) profit, daily sale or rough (gross) profit, sale numbers of each product per unit-time period or in the course of time.

The estimated sale data may be also determined on the basis of the past actual sale outcome data. For example, those for the daily-sale or sale numbers of each product per unit-time period may be obtained by calculating them based on the ratio of an average sale numbers of each product pre unit-time period on the same day of a week during the past few months so that a target of a total sale amount of the day may be fulfilled.

An outcome control system is provided, comprising a least one of a means for inputting actual sale outcome data, a means for recording actual sale outcome data, a means for inputting actual production outcome data including the day's production (generation) outcome as to the type and volume of each merchandise produced on the day, production loss, the number of testing, used amount, storing amount and the like, a means for accumulating and/or storing the actual sale outcome data, a processing means for reading the actual sale outcome data and the actual production outcome data and calculating the number of each product or merchandise arranged on a counter based on the difference in the number of each merchandise between the actual sale outcome data and the actual production outcome data, and a means for recording the number of each product or merchandise arranged on the counter.

The outcome control system includes a means functioning as a central processing unit, which on instruction from a control program in a main memory may read the actual sale outcome data and the actual production outcome data from each recording means, and calculate the number of each product or merchandise arranged on the counter based on the difference in the number of each merchandise on real time.

Further, a job instruction (production instruction) system is provided, comprising at least one of a means for preliminarily recording master data consisting of information concerning raw material conditions of the merchandises, processing and production conditions thereof and the working time required therefor, and operation and capacity conditions of individual production and cooking facilities (for example, dough conditioner and/or thawing chamber, final proofing chamber and refrigerating and storage chamber, and oven and/or fryer), etc., as well as given rules to be referred to in the determination of working contents (order, scheduling rule for production and/or cooking facilities, panning rule, rule for determining the merchandise on simultaneous operation, and rule for leveling necessary workers, etc.); a means for selecting the rules on the basis of the numbers of each merchandise arranged on a counter, the master data, the actual production outcome data, and/or the estimated sale data, which are read from each recording means; a means for applying the rules thus selected to the above data to prepare a job instruction describing the contents of the works regarding the blending and baking and/or oil cooking process of frozen bread dough or the preliminary preparative process of daily dishes and other cooking processes thereof; and a means for outputting the job instruction.

The means for outputting the job instruction may include a means for displaying on a computer display, or an appropriate means for outputting in the form of a document such as a printer and/or a means for outputting in the form of voice.

The job instruction system includes a means functioning as a central processing unit, which on instruction from a control program in a main memory may select the rules on the basis of the numbers of each merchandise arranged on the counter, the master data, the actual production outcome data, and/or the estimated sale data, which are read from each recording means, apply the rules thus selected to the above data to prepare a job instruction or schedule describing the contents of the works on request at least once a day.

Examples of the job instruction or schedule outputted from the job instruction system are shown in FIG. 3, FIG. 4, and FIGS. 8–12.

Furthermore, in the central processing unit of the job instruction system, various kinds of store control data of individual stores may be obtained. Such store control data include for example simulation data of the operation status of each facility the day after tomorrow and thereafter and patterns of the number and type of necessary workers for the operation, baking loss ratio of each merchandise to be produced and a loss ratio due to remnants, graphs displaying the change of the sale numbers and baking numbers of each merchandise per unit-time period, the sales and crude profit of each merchandise or each category group, and amounts of raw materials used at each store. The store control data of individual stores may be outputted as an daily report by the means for outputting in the Job instruction system. An example is shown in FIG. 7.

In such manner, the number of workers required per unit-time period (zone) the day after tomorrow and thereafter can easily be grasped, while the part-time workers required therefor may readily be arranged. For the development of a new store, further, the ability thereof may be examined and checked while the equipment necessary therefor may be determined in a readily manner.

The amounts of raw materials used at each store may automatically be calculated as store control data, to automatically order raw materials required for the store through LAN system of the invention. In such manner, such complicated works for the order of raw materials may readily be performed by part-time workers.

The above-mentioned systems of the present invention may be connected with each other by radio or wire so that various data recorded in each system may be utilized. In the systems of the present invention, one means such as that for recording in one system may be so constructed that it can function also as another means for recording in the other system. Examples of the function of the present system are shown as in a flow chart in FIG. 13 and FIG. 14.

As one embodiment of the present invention, the sale estimation system, the outcome control system and the job instruction system may be independently constructed with an individual apparatus such as a computer. In such case, each apparatus may be connected through an appropriate electronic communication circuit which is well known in the art, constituting a network system such as in-store LAN (Local Area Network) constructed in each store or WAN.

In such case, the means for inputting the actual sale outcome data and/or the means for recording the actual sale outcome data are not installed in the system, but may be installed separately at a selling point (counter), so that the actual sale outcome data may be transmitted on real time through LAN to each system and processed there in various ways (POS (Point of Sales) system).

The means for recording the various data such as the estimated sale data and the actual sale outcome data may be constructed with a high-performance computer called "store server." In this case, the various data are transmitted first to the store server, and then transmitted from the server to each system to be recorded there in the recording means. One example of the network system is shown in FIG. 2.

As another embodiment of the present invention, two or more systems selected from the sale estimation system, the outcome control system and the job instruction system may be integrated into an apparatus such as a computer to constitute an integrated system for the production of just fresh-cooked food products. Alternatively, all of the above systems may be integrated into an apparatus such as a computer to constitute an integrated system for the production of just fresh-cooked food products. In such case, a plural number of the means for inputting the actual sale outcome data, the means for recording the actual sale outcome data, central processing units and/or the main memories of each system may be independently comprised in the integrated system, or alternatively each kind of means may be integrated as a single means in the integrated system. Even in such case, the actual sale outcome data can be inputted on real time and processed on real time in each system.

In the integrated system of the present invention, the means for inputting the actual sale outcome data and/or the means for recording the actual sale outcome data are not installed in the system, but may be installed separately at a selling point (counter), so that the actual sale outcome data may be transmitted on real time through LAN to each system and processed there in various ways (POS (Point of Sales) system). An example of the above system is shown in FIG. 15.

As mentioned before, a more simplified form of the system comprises using the estimated sale data designed based on the past actual sale outcome data as it is with no modification on the basis of the day's actual sale outcome data with a computer on occasion.

Accordingly, the system of the present invention may be constructed as a simplified system which do not comprise the means for inputting the actual sale outcome data, and the means for recording the actual sale outcome data.

In this system, since the day's actual sale outcome data are not transmitted from the means for inputting the same data to each of the present system or the store server, the estimated sale data will not modified on the basis of the actual sale outcome data under the given rule at a given interval of time in the sale estimation system.

However, based on the estimated sale data designed on the basis of the past actual sale outcome recorded and controlled in the means for recording the estimated sale data, the job instruction data and the store control data may be output by the aforementioned procedures, to achieve the same effects.

After daily closing of the store or during intermediate store opening hours, for example, the actual sale outcome data may be collectively input into the store server, to modify and update appropriately the estimated sale data on occasion.

Each system of the present invention may be connected through an appropriate electronic communication line which is well known in the art such as ISDN circuit, Internet using optical fibers, or an exclusive circuit, to a host computer located outside the stores, for example that in a central office. In such case, the system of the present invention may be constructed as a production system consisting of the host computer and a plural system wherein the host computer collectively accumulates and controls the information from each store and transmits the master data to the system of each store.

Accordingly, the present invention is further related to a program for implementing or processing the sale estimation system, the outcome control system, the job instruction system, and/or their integrated system with a computer, or to a program for making a computer operate or function as the above system in the production and supply of just fresh-cooked food products, and to a recording medium recording the program and that is readable or accessible for the computer.

The program according to the present invention may be recorded on any appropriate recording media well known in the art, such as a hard disk, floppy disk (FD), CD-R, CD-RW, magnetic and optical (MO) disk, or magnetic tape.

The present invention is still further related to a method for a sale estimation in the production and supply of just fresh-cooked food products, comprising a step for inputting estimated sale data (sale plan number) designed based on the past actual sale outcome into a means for recording the estimated sale data, and a step for recording and/or controlling the estimated sale data; to said method, further comprising a step for inputting actual sale outcome data into a means for recording the actual sale outcome data, and a step for the central processing unit's reading the estimated sale data, the actual sale outcome data and the rule from each recording means and modifying the estimated sale data under the rule on the basis of the actual sale outcome data at least once a day.

The present invention is related to a method for outcome control in the production and supply of just fresh-cooked food products, comprising a step for inputting actual sale outcome data into a means for inputting the actual sale outcome data, inputting actual production outcome data into a means for accumulating and/or storing the actual production outcome data, a step for the central processing unit's reading the actual sale outcome data and the actual production outcome data from each recording means and calculating the number of each product or merchandise arranged on a counter based on the difference in the number of each merchandise in any time, and a step for recording the number of each product or merchandise arranged on the counter.

The present invention is related to a method for job instruction in the production and supply of just fresh-cooked food products, comprising a step for the central processing unit's selecting the rules on the basis of the numbers of each merchandise arranged on a counter, the master data, the actual production outcome data, and/or the estimated sale data, a step for applying the rules thus selected to the above data read from each recording means, and a step for preparing a job instruction or schedule describing the contents of the works on request at least once a day.

The present invention is further related to a method for controlling the system in the production and supply of just fresh-cooked food products, which consists of a combination of two or more the above methods.

Orders described below are examples for use in using the preparation of the contents of works. An appropriate combination thereof enables the preparation of a job instruction.

1. Order following and coping with sale (production on order)
[Order Occurrence Condition]
Merchandise with the stock on counter below the base number.
[Production Volume]
Volume estimated to be sold within one hour from the current point.
[Remarks]
Generally, no order occurs unless counter stock is decreased due to the merchandise sale despite any plan. By presetting the store stock base number to a high level, the production according to the plan may be achieved.

2. Leveled order of operation and equipment capacity (minimum required workers)
[Order Occurrence Condition]
Based on the estimate 2 hours later at a 30-minute interval, the labor and equipment load should be calculated at the time. When the estimate over-flows from the respect of the labor and equipment capacity, the orders of merchandises occupying lower positions in an increasing order of a preferential degree for pre-planned production sequentially occur. The dough of a shorter usable time or occupying a lower position in an increasing order of a preferential fresh-baking degree occupies a lower position in the increasing order of the preferential degree of pre-planned production.
[Production Volume]
Volume to be produced two hours later under planning.

3. Production of half-finished product outside estimation
[Order occurrence condition]
Merchandises requiring several processes, which are retained at intermediately processed state and are close to the limit of the usable time. For example, frozen dough or fried products are thawed and are thereafter being charged in the next process or equipment.
[Production volume]
Preliminarily charged volume.
[Remarks]
Even with no production on order or leveled order, production order occurs on the basis of the estimation.
Merchandises half-finished will be a loss unless the merchandises are processed to the final stage. Therefore, production order occurs the last minute within the quality retention.

FIG. 5 shows the flow chart depicting a logic flow in the program used for determining the contents of actual job instruction (after store opening) for molded frozen bread dough, using the computer, as based on the above orders.

Additionally, the oven scheduling rule is for example as follows.

Because merchandises are taken out from the oven in various timings, it is substantially difficult to adjust the timings so as to avoid the overlapping of the taking-out timings. Further, instantaneous occurrence of any peak may be coped with human labors.

Oven scheduling should be focused on the timing of the pre-oven operation. By dividing then the operation works into patterns such as a pattern of diversified work load and a pattern of concentrated work load, oven scheduling is adjusted.

The scheduling rule is modified, depending on the bottom time zone and peak time zone. Because no customer comes to the store prior to store opening, for example, the works then are relatively less, so that the following "bottom hour rule" and "peak hour rule 1" are preferably applied. After store opening, then, "peak hour rule 2" or "peak hour rule 3" is preferably applied.

[Bottom Hour Rule]
The decrease of the peak of the number of workers involves the decrease of the equipment operation ratio instead.

The pre-oven works never overlap with other pre-oven works and post-oven works.

[Peak Hour Rule 1]
A partial overlap of the pre-oven works with the post-oven works is approved.

With a slight time space after the termination of the post-oven works, the next batch can be started. In that case, the overlap of the post-oven works with the pre-oven works is permissible.

[Peak hour rule 2]
No problem is involved in the overlap of the pre-oven operation with the post-oven works at each step. Immediately after the termination of the post-oven works, the pre-oven works start.

[Peak hour rule 3]
So as to attain only the equipment operation ratio at 100% in the true sense, the pre-oven and post-oven works are permitted to almost overlap to each other and be started (but with a space hour enough for the time required for the charging and taking out of the BS).

One example of the rule to be obeyed for panning frozen bread dough in a dough conditioner is the following method.

The state of a final proofing chamber is checked at a 30-minute interval. In case that the progress of the proofing of the dough in the final proofing chamber is poor, then, baking order for leveling occurs. Therefore, the timing of an actual panning is determined by the following two points, namely the time when the final proofing chamber is vacant or the time when it is needed to charge dough on time schedule.

Because the dough to be panned in the final proofing chamber is based on the sale estimate, it is necessary to again examine and check when the dough preliminarily panned is to be baked as dough on the basis of the current estimate in case that the sale estimate is to be modified (be estimated again) from time to time.

In case the sale estimate has been modified, the subject time of each final proofing is to be modified, also involving the adjustment of the subject time and merchandises of each final proofing and BS numbers for the next time.

In that case, the following conception is to be obeyed.
"Conception"

Within the range of dough usable hours (usable time), the preliminarily charged dough is allocated. Thus, the numbers of charged merchandises and BSs/usable time are never changed.

Regarding dough newly required from sale estimation but not yet charged in the final proofing chamber during retention hours, the dough is regarded as estimate loss.

Based on the rule for determining the panning timing as described above, FIG. 6 shows a flow chart of the logic flow in the program for the determination of the contents of job instruction for panning, using the computer.

The store pre-closing work (final baking work) is carried out for all of the bread doughs resting in the standby mode after the final proofing, which are baked according to the logic of "baking order for leveling retention in final proofing chamber" in case that "panning is not yet required" as shown in FIG. 6.

Method for Producing Flesh-cooked Food

For the method for constantly supplying just fresh-baked bread, how to supply bread dough sufficiently proofed in a final proofing chamber to a state enough for immediate baking is the most essential.

From the aforementioned respect, the present inventors have found a method for constantly supplying bread dough sufficiently proofed in a final proofing chamber and thereby constantly supplying just fresh-baked bread, comprising a cycle system in a predetermined time duration unit of about one hour to 4 hours, wherein the cycle system comprises repeating thawing and proofing of the frozen dough type of each bread type or doughnut type necessary per unit-time period, resting of the doughs taken out of the final proofing chamber and baking of the doughs in ovens under fixed preset conditions.

More specifically, the invention relates to a method for producing and supplying just fresh-baked bread using frozen bread dough, comprising simultaneously subjecting the frozen bread doughs necessary for the bread types and numbers to be supplied per unit-time period under planning to a thawing and final proofing process, resting the bread doughs in a standby mode under a constant condition, and baking at least a part of the bread doughs rested in the standby mode in ovens under fixed baking conditions.

The present invention relates to a method for producing and supplying just fresh-baked bread using frozen bread dough, comprising simultaneously subjecting the frozen bread doughs necessary for the bread types and numbers to be supplied per unit-time period under planning to a thawing process, resting the bread doughs in a standby mode under a constant condition, and baking at least a part of the bread doughs rested in the standby mode in ovens under fixed baking conditions.

Further, the present invention relates to a method for producing and supplying just fresh-fried doughnuts using frozen bread dough, comprising simultaneously subjecting the frozen bread dough necessary for the doughnut types and numbers to be supplied per unit-time period under planning to a thawing and final proofing process, resting the bread doughs in a standby mode under a constant condition, and baking in ovens under fixed baking conditions and/or cooking with an oil fryer at least a part of the bread doughs rested in the standby mode.

Still further, the present invention relates to a method for producing and supplying just fresh-fried doughnuts using frozen bread dough, comprising simultaneously subjecting the frozen bread dough necessary for the doughnut types and numbers to be supplied per unit-time period under planning to a thawing process, resting the bread doughs in a standby mode under a constant condition, and baking in ovens under fixed baking conditions and/or cooking with an oil fryer at least a part of the bread doughs rested in the standby mode.

The unit-time period may appropriately be predetermined by a person with an ordinary skill in the art, depending on the product type, the store scale, the product number to be supplied, the type, scale and capacity of kitchen equipment. The unit-time period is generally one to 4 hours. Furthermore, the unit-time period may appropriately be modified within the daily supply time zone at each store, on a needed basis.

The unit-time period may be determined on the basis of the duration of resting in the standby mode of dough after final proofing. A time zone with a large variation of sale and a time zone with almost no variation of sale are present daily. Because the processing capacity of apparatuses for use in thawing and final proofing is generally limited, the unit-time period is shortened in the time zone with a large variation of sale, while in the remaining time zone, the unit-time period is preset longer. In such manner, products are preferably supplied at a baking velocity, depending on the sale's variation.

BRIEF DESCRIPTION OF THE DRAWINGS

FIGS. 3A and 3B depict one example of the job instruction document output from the job instruction system;

FIGS. 4A and 4B depict one example of the job instruction document output from the job instruction system;

FIGS. 8A–8F depict one example of the job instruction document output from the job instruction system;

FIGS. 9A and 9B depict one example of the job instruction document output from the job instruction system;

FIG. 10 depicts one example of the job instruction document output from the job instruction system;

FIG. 11 depicts one example of the job schedule output from the job instruction system;

Function of preparing a plan of monthly sale or rough (gross) profit: the function of determining a target (estimation data) of the monthly sale amount (the amount of money) or rough (gross) profit on the basis of the past monthly actual sale outcome data;

Function of preparing a plan of weekly sale or rough (gross) profit: the function of determining a target (estimation data) of the daily sale amount (the amount of money) or rough (gross) profit on the basis of the past weekly and daily actual sale outcome data;

Function of preparing a plan of daily sale or rough (gross) profit: the function of determining the sale numbers of each product for the target of the daily sale amount on the basis of the past actual sale outcome data;

Function of planning the production (sale) numbers of each product per unit-time period: the function of preparing the production plan on the basis of the sale estimation data and the like;

Function of modifying the production (sale) plan of the day: the function of modifying the sale estimation data in accordance with sale trend by checking the actual sale outcome data of the day;

Function of instructing the job: the function of outputting the contents of the works prepared by the job instruction system with an appropriate output means;

Function of baking simulation: the function of preparing store control data in order to check and examine the ability of a new store and to prepare a daily time schedule;

Function of preparing a workers plan: the function of grasping the number of workers required per unit-time period (zone) the day after tomorrow and thereafter and the like on the basis of the store control data;

Function of ordering and stocktaking: the function of calculating the numbers of each merchandise arranged on the counter, the amounts of raw materials used and stored on the basis of actual sale outcome data and actual production outcome data;

Function of collecting and controlling actual outcome data: the function of collecting and analyzing actual sale outcome data per unit-time period and actual production outcome to use them for the sale estimation thereafter;

Function of accumulating and transmitting data: the function of transmitting the information from each store through an electronic communication line to a host computer located outside the stores, or receiving the master data from the system of the central office.

Figure 14:
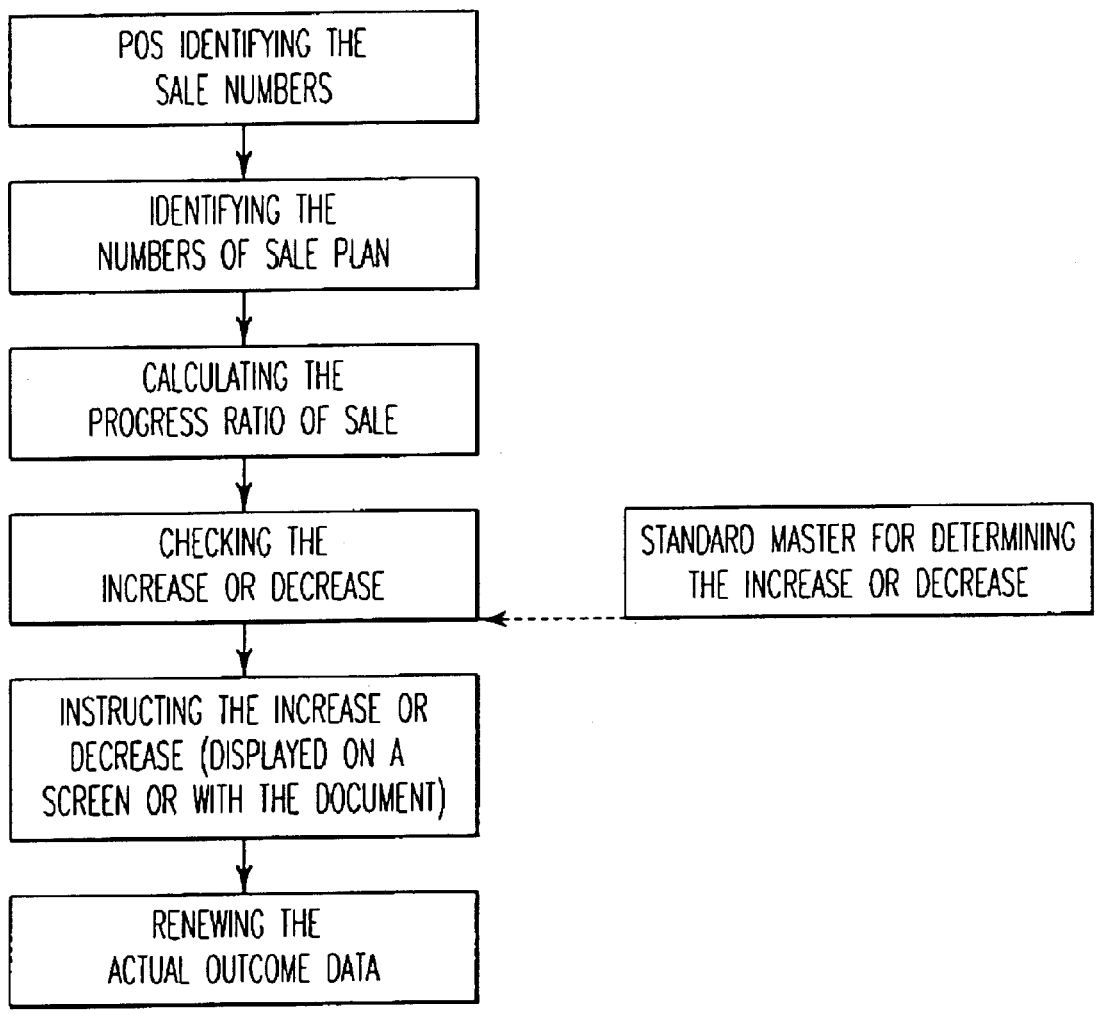

FIG. 14 depicts one example of the flow chart showing actual functions of the present system.

Figure 15:
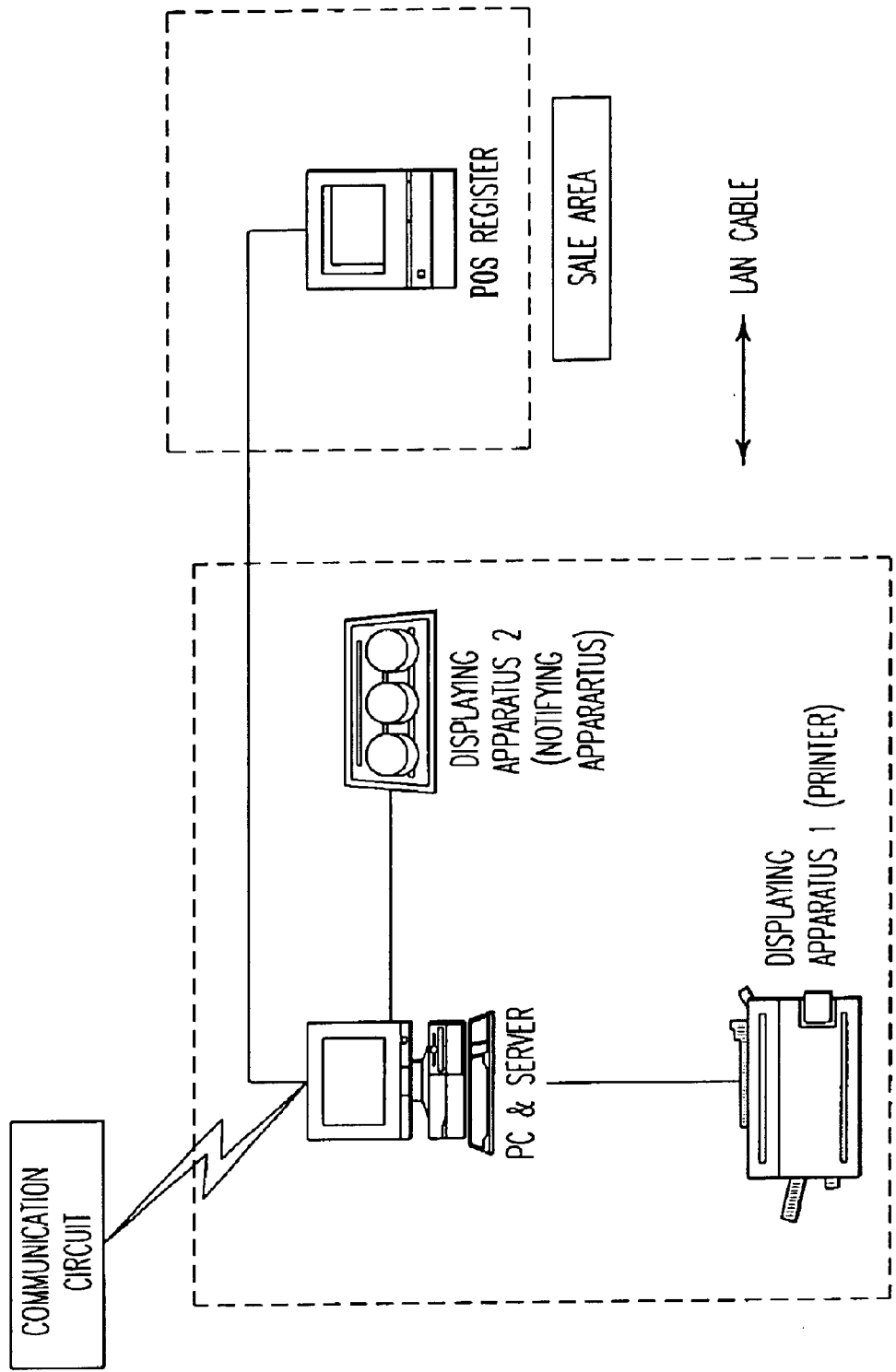

FIG. 15 depicts one example of the constitution of the sale estimation, job instruction and outcome control systems.

DETAILED DESCRIPTION OF THE INVENTION

Hereinbelow, the materials of frozen bread doughs for use in accordance with the present method and the ratios thereof are with no specific limitation. Depending on the final product types such as various pastry types including bean jam bread and butter roll, for example, a person with an ordinary skill in the art may select the materials and the ratios, appropriately. The starting material prepared by appropriately blending together individual materials is subjected to individual processes well known to a person with an ordinary skill in the art, for example preliminary process, kneading, and proofing, which is then passed through final processes such as dividing, rounding, resting (dry-proofing), shaping and molding and is then frozen by using a plasto-freezer, for storage under freezing at an appropriate temperature in a freezer.

The frozen bread dough in accordance with the invention encompasses bread dough frozen after the bread dough is subjected to final proofing process (frozen bread dough after final proofing), and bread (dough) frozen after partially or completely baking and/or cooking with an oil fryer (frozen bread dough after baking).

In case that such frozen bread dough after final proofing or frozen bread dough after baking is used, the final proofing process and/or baking process in the aforementioned method is not any more needed, which thus shortens the production lead time in kitchen and enables the supply of just fresh-baked bread, more satisfying the demand from consumers. In case that the frozen bread dough after final proofing is used in accordance with the present method, more specifically, the frozen bread dough may be thawed and immediately subjected to the baking process on a needed basis; when the frozen bread dough after baking is used, alternatively, the frozen bread dough may be thawed and heated with an electric range or oven, for immediate supply thereof as just fresh-baked bread.

In the following description, frozen bread dough is mainly used, but the present method is applicable to scratch dough or refrigerated bread dough recovered through mixing process, in place of frozen bread dough.

Even in case that the present method is practiced using scratch dough or refrigerated bread dough, furthermore, the thawing and final proofing process may be carried out under the conditions as described below. It is obvious to a person with an ordinary skill in the art that such scratch dough or refrigerated bread dough can be proofed with no thawing in that case.

From the respect of easier, clear understanding, daily production and sale at a small store is described by way of example. The method is also applicable to the supply and consumption of other just fresh-cooked food products.

In accordance with the present method, preferably, an automatic thawing/final proofing chamber generally called as "dough conditioner" is used at the thawing and final proofing process.

Preferable examples of the dough conditioner usable in accordance with the present method include those with an ability of a temperature raising rate of 0.5 ° C./min or more and a temperature lowering rate of 0.5° C./min or more, for example a dough conditioner with a freezer compressor at an output above 400 W, preferably above 600 W and a heater at an output above 600 W, preferably above 1000 W per refrigerated bread dough 20 Kg for freezing.

A thawing/final proofing chamber with a capacity capable of receiving the frozen dough of a volume corresponding to the consumption per a given unit-time period (for example, 3 to 4 hours) is prepared. Because a time period around 3 hours is generally required for the thawing and final proofing of frozen dough, conveniently, the chamber should have a capacity coping with the time period. When the volume of frozen dough changes, such as small dough or large dough, the chamber size is adjusted to the volume. Therefore, two or more thawing/final proofing chambers may be used concurrently.

A person with an ordinary skill in the art can appropriately select and determine the conditions for the thawing and final proofing process.

So as to rest the bread doughs drawn out of the final proofing chamber after sufficient proofing in the standby mode under constant conditions, the bread doughs are placed in a standby mode in a standby storage chamber, prior to baking.

The resting in the standby mode is essentially executed under the constant condition, in order to constantly retain the doughs prior to baking at a state for possible baking under preliminarily fixed baking conditions, if necessary.

The inventors have elucidated that humidity in addition to temperature among such conditions is significant for the quality of the resulting baked bread product. When various types of bread dough are rested at a temperature of 5 to 15° C., preferably 8 to 13° C. and a humidity of 60 to 98%, preferably 65 to 95% in the standby mode, more specifically, the bread dough can be retained at an identical state for about 4 hours, preferably about 3 hours; depending on the extent of bread sale and consumption, then, a necessary volume thereof is taken out of the standby storage chamber and is baked in the ovens. In such manner, just fresh-baked bread in its true sense can be supplied.

The temperature range for the standby resting is shown in case that general yeast is used. When low temperature-sensitive yeast (yeast species with significantly reduced proofing potency or almost no proofing potency because of the loss of the potency in the low-temperature zone) as described in Japanese Patent Application Laid-open No. 234939/1992 is used, the temperature for the standby resting may be elevated so as to satisfy the temperature-sensitive range.

For example, Japanese Patent Application Laid-open No. 155100/1995 proposes a method for the preliminarily processing of frozen bread dough prior to baking, comprising thawing frozen dough and taking the resulting dough out of a final proofing chamber and retaining the dough at a temperature of 0 to 18° C., but absolutely never describes any humidity conditions.

In case that non-shaped frozen bread dough is used, the frozen bread dough may additionally be subjected to molding or shaping and final proofing processes during the duration of the standby resting.

As the standby storage chamber, use can be made of for example a general humidifier-type refrigeration storage chamber. Because the dough conditioner may be used as the standby storage chamber, in that case, the bread dough after final proofing is not required to be transferred to any standby storage chamber.

Figure 1A:
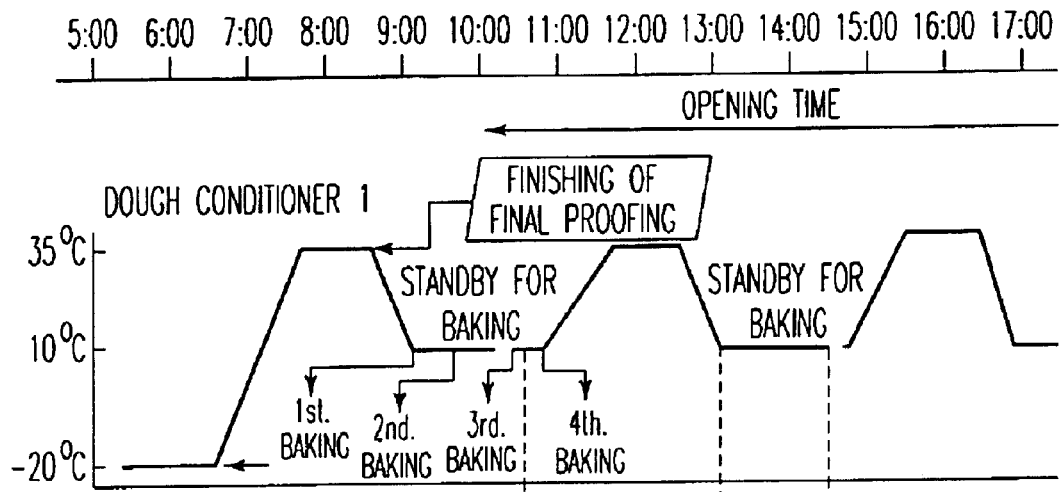
FIGS. 1A, 1B and 1C depict a view of the operation cycles of two or more dough conditioners used in accordance with the present method.
Figure 1B:
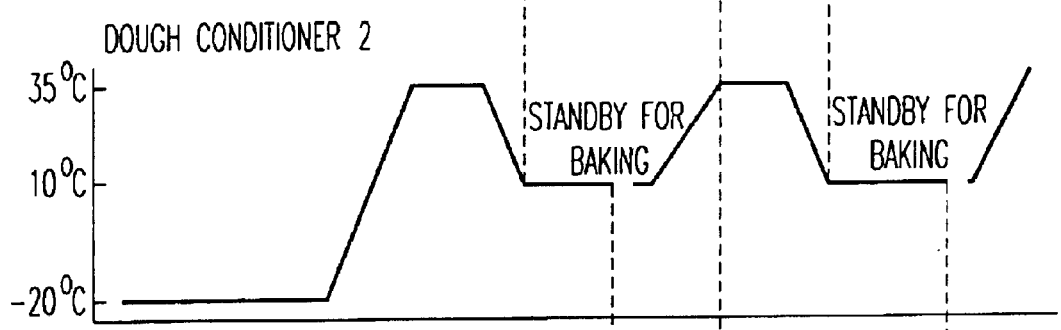
Figure 1C:
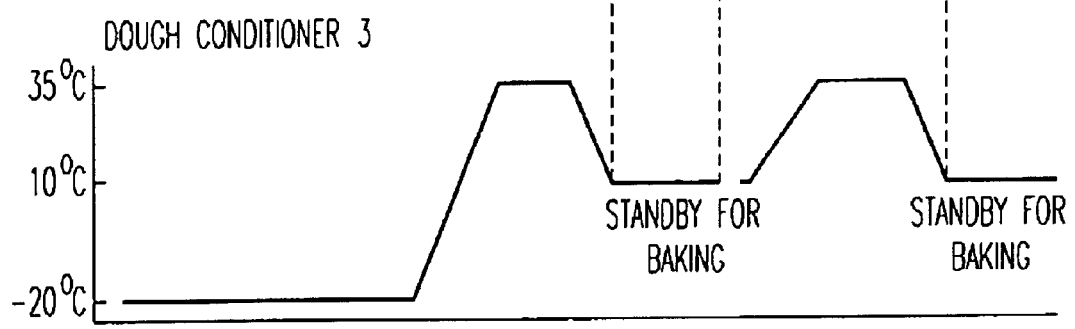
Figure 2:
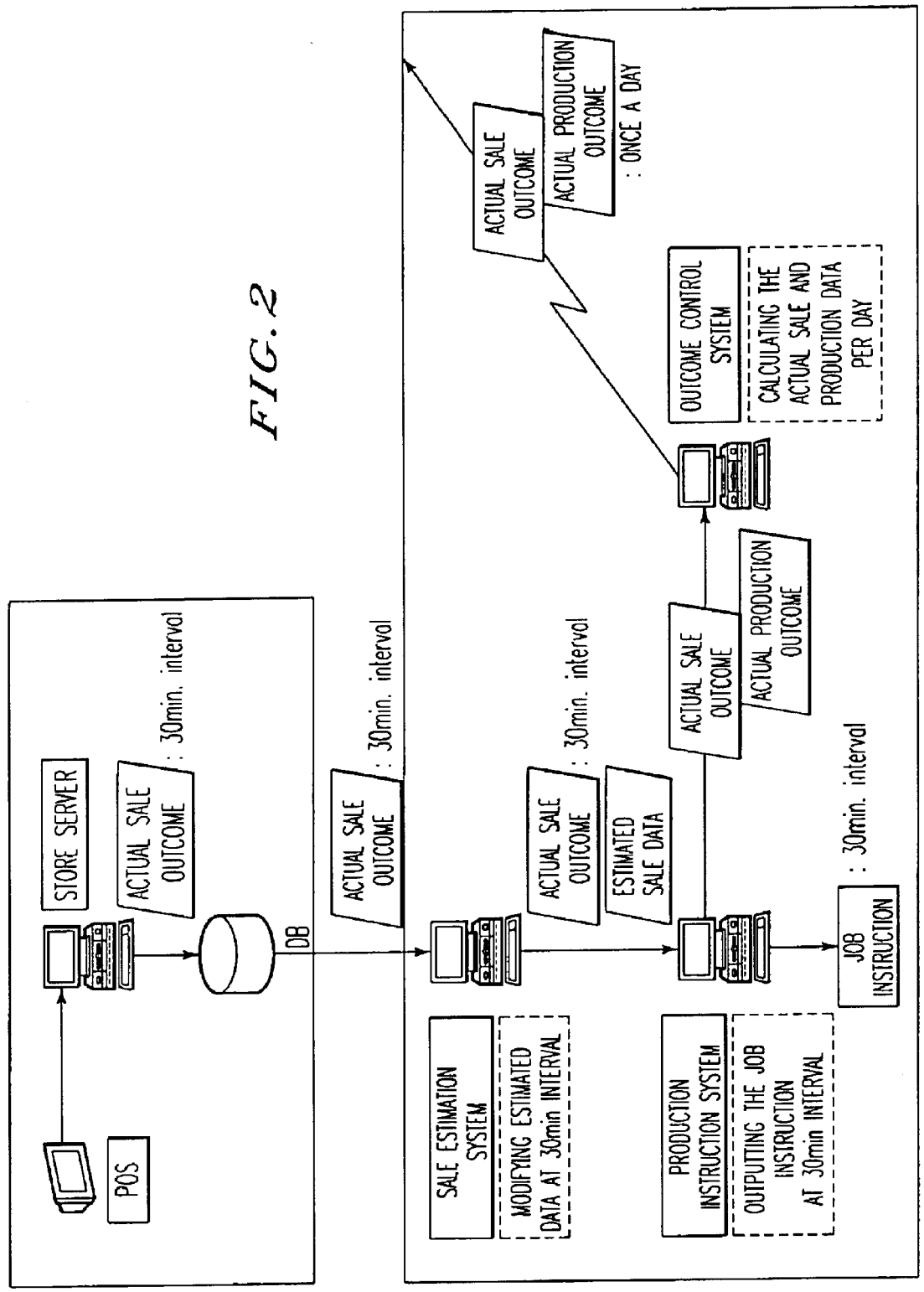
FIG. 2 depicts one example of the schematic view of the system of sale estimation, job instruction and actual sales outcome control.
Figure 5:
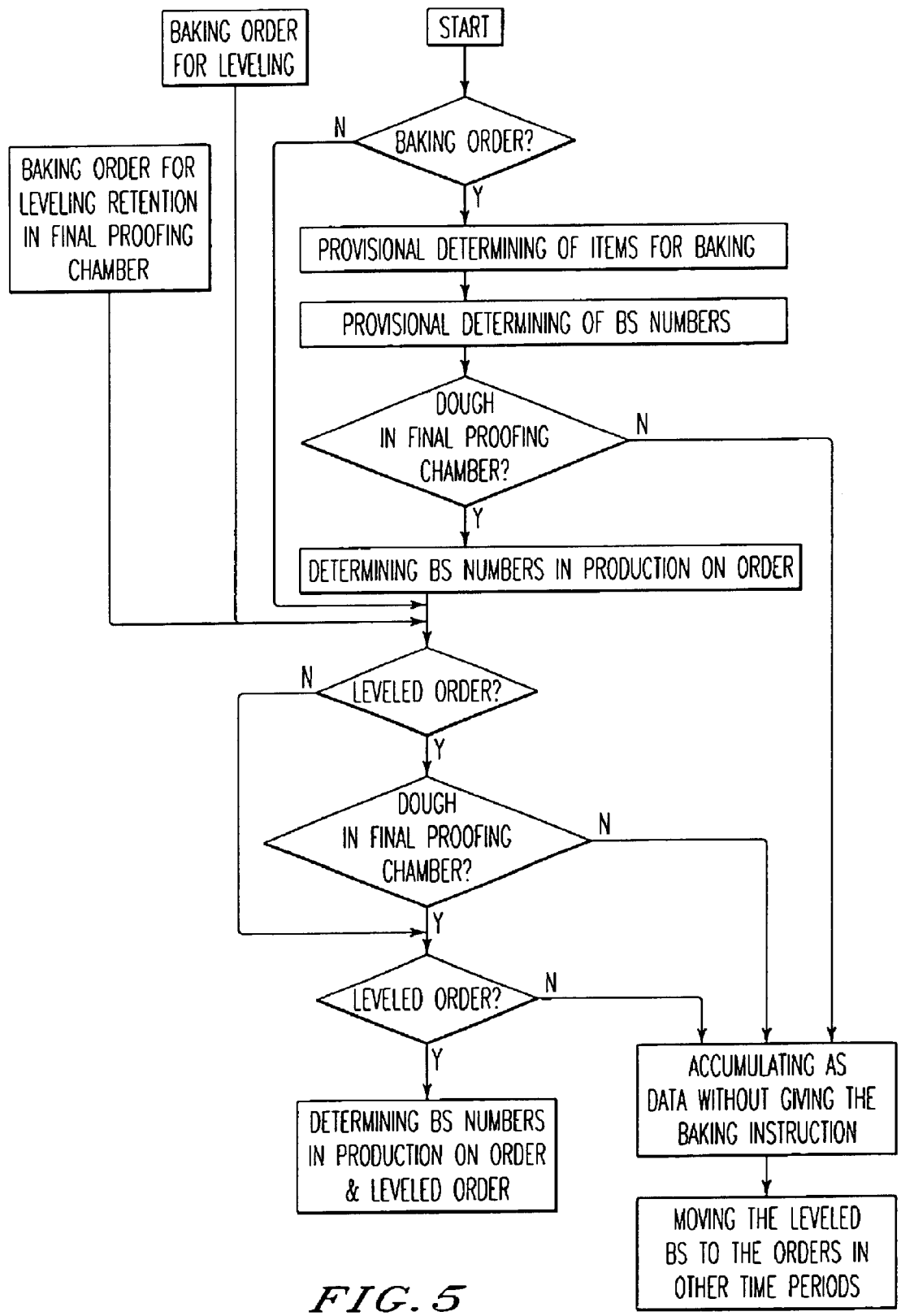
FIG. 5 depicts the flow chart of the logic flow in the program for use in determining the contents of actual job instruction for shaped frozen bread dough, using a computer.
Figure 6:
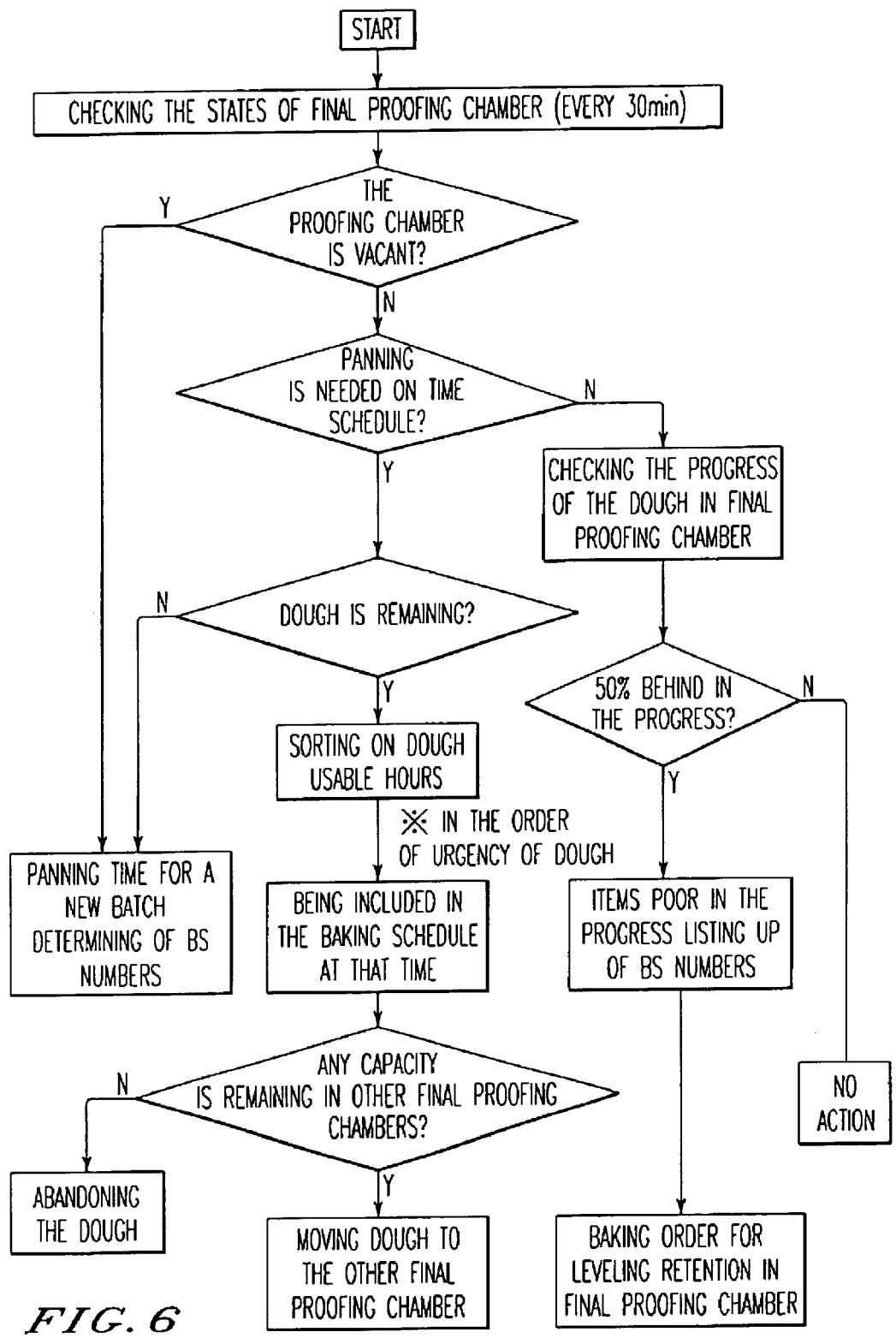
FIG. 6 depicts the flow chart of the logic flow in the program for use in determining the contents of actual job instruction for panning, based on the rule for determining the panning timing.
Figure 7A:
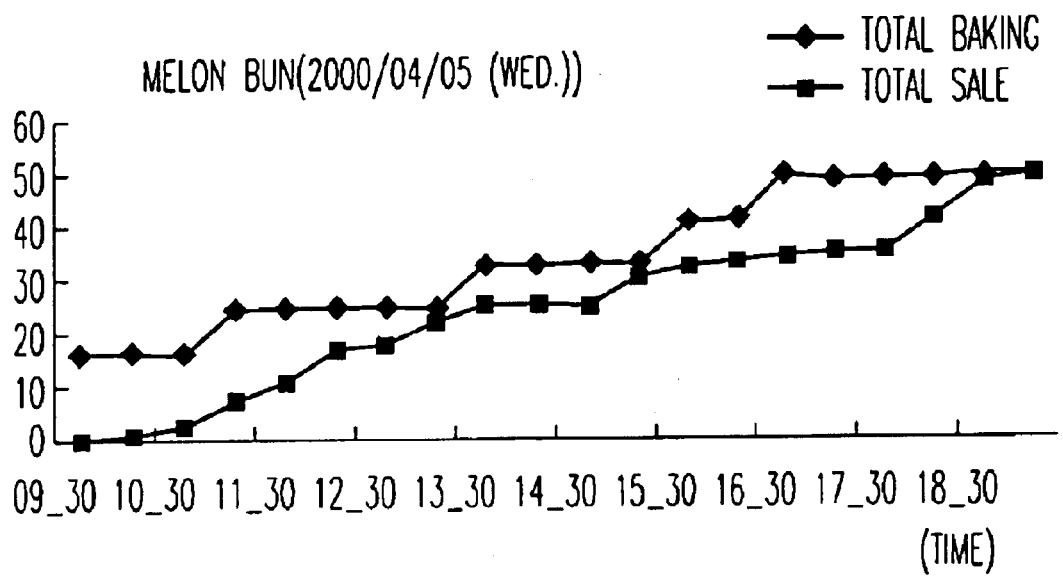
FIGS. 7A and 7B depict graphs of the change of the sale in the number of each fresh-cooked food merchandise and the change of the baking number thereof per unit-time zone.
Figure 7B:
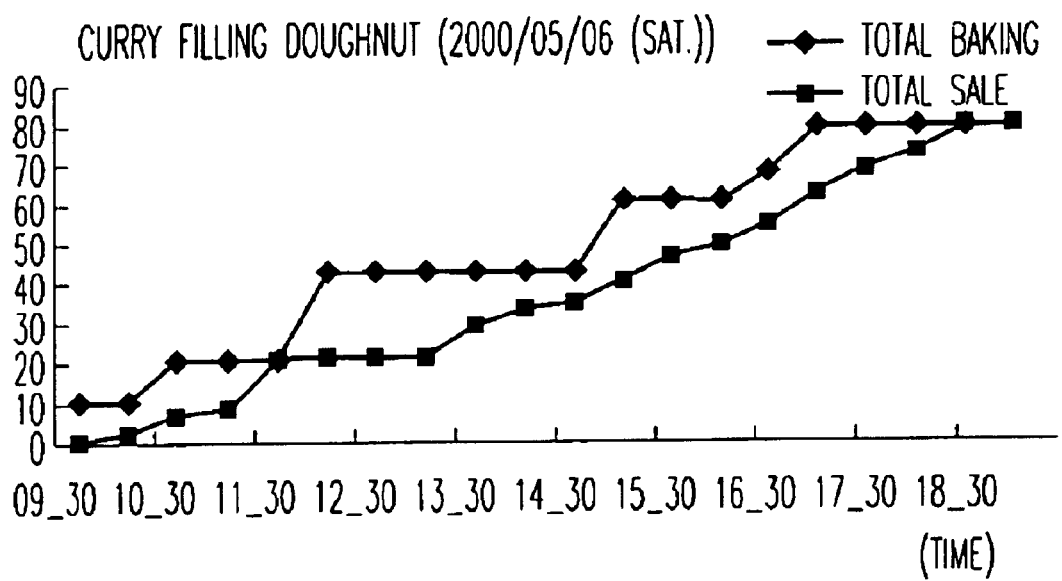

In case that the thawing process, final proofing process and standby resting process of bread dough is carried out in the same automatic thawing and final proofing chamber, two or more such dough conditioners are used and operated at operation cycles thereof with appropriate time lags, to supply just fresh-baked bread with not any intermission throughout daily store open hours. The operation cycles are shown in FIG. 1.

As one example of the preliminary processing prior to baking may be mentioned a method for the pre-baking treatment of frozen bread dough, comprising continuously carrying out a thawing process and a final proofing process of the frozen bread dough in a dough conditioner while keeping its inner temperature at a range of 17~40° C., preferably of 22~35° C. and its inner relative humidity at a range of 50~75%, preferably of 60~65%, and after the completion of the final proofing, lowering its inner temperature to a range of 5~15° C. at a lowering rate of 0.2° C./min or more, preferably 0.4° C./min or more while controlling the difference between a dew point in the container and a temperature on the bread surface within 20° C. or less, preferably 15° C. or less more so that the condition of the bread dough may be maintained.

Alternatively, the processes of thawing and final proofing may be carried out by raising its inner temperature to a range of 17~40° C. at a raising rate of 0.1~2° C./min while controlling the difference between a dew point in the dough conditioner and a temperature on the bread surface within 20° C. or less, preferably 15° C. or less.

Further, after the completion of the final proofing, the bread doughs may be transferred and put in a general humidifier-type refrigeration storage chamber with its inner temperature at a range of 5~15° C., preferably of 8~13° C. and its inner relative humidity of 60~98%, preferably of 65–95% so that the condition of the bread dough may be maintained.

The methods disclosed in Japanese Patent Application No. 258030/1999 and Japanese Patent Application No. 258031/1999 may be used as the above preliminary processing prior to baking.

An "inner relative humidity" means that of air in the container and is an average value subjected to fluctuation at a range of about ±10%. The difference between a dew point in the container and a temperature of the bread surface is an average value and subjected to fluctuation at a range of about ±10%.

The above difference may be determined by any method known to those skilled in the art. For example, the dew point of air may be obtained from a psychrometric chart such as t-H chart (known as "Carrier chart") that shows a relationship between a temperature and humidity, and the temperature on the bread surface may be actually measured by means of a thermoelectric couple thermometer, for example.

The thawing process may be carried out separately in a thawing apparatus from the final proofing process, and the fresh-baked bread may be provided by appropriately resting the bread doughs in the standby mode.

So as to supply various bread types on an order basis, preferably, each total time required for thawing and final proofing of various types of frozen doughs should be same from the respect of job simplification.

However, the ratio of blended materials in many types of bread dough varies significantly, depending on the intended bread type. Even if the added ratio of yeast to total weight be same in different types of the dough, when the quantity of salt or sugar added varies, the activity of yeast is prominently influenced, so that the generated volume (generation rate) of $CO_2$ gas distinctively varies.

Furthermore, the optimum dough expansion (swelling) rate at the final proofing, namely the optimum gas generation level of yeast varies, depending on the bread type. Depending on the difference in the shape and divided portion of frozen dough, the thawing rate may vary.

For example, frozen dough filled with fillings and bean jams is generally likely to require a longer thawing time.

In such case, the total process time can be made equal by adjusting the amount of yeast blended.

By modifying the amount of yeast to be added per each type of the dough, measuring the amount of generated $CO_2$ gas at individual temperatures of 10° C. sheath, for example, inserted into the bread dough, the amount of yeast to be added to each type of the frozen bread dough is specifically determined, depending on the type, weight and shape of bread dough, to make equal the total time required for thawing and proofing.

Frozen dough types for loaf of bread and bulky French bread are subjected to re-molding (re-shaping) process after thawing. Even for some of shaped and frozen bread dough, when their intended bread for is of a complicated shape it is better to re-shape the dough. In case that a loaf of bread is to be produced from frozen plate dough, for example, the frozen plate dough is thawed at 10° C. to 35° C.; then, the resulting dough is rounded, followed by bench time, if necessary, to mold the dough in a horse shoe form for Pullman, or a football form for round-top bread; subsequently, the dough is placed in a baking pan of a predetermined shape for final proofing. The resulting dough may satisfactorily be baked as it is. If desired, however, the dough may be rested in the standby mode and is then baked.

The baguette-type French bread is also subjected to the same process. The frozen plate dough is thawed at 10° C. to 35° C.; then, the resulting dough is rounded, followed by bench time, if necessary, to mold the dough in a baguette or a batard; subsequently, the dough is held between campus-cloth for French bread for final proofing. The resulting dough may satisfactorily be baked as it is; if desired, the dough may be rested in the standby mode and is then baked.

Because it is relatively difficult to achieve quick cooling of the inner part of the bulky bread even at a low temperature, the duration of the standby resting is generally limited. In such case, final proofing is satisfactorily carried out in a more or less restricted fashion. Otherwise, it is preferable to design a baking schedule enabling the minimum duration of the standby resting time. So as to harmonize the thawing and final proofing time of the bulky bread with the thawing and final proofing time of the other types of bread, the thickness of these dough types may be adjusted at the stage of plate dough.

From the respect of the time period required for rounding and molding, the total time of thawing and final proofing is satisfactorily short. In case that frozen plate dough is used, therefore, the addition of sponge or pre-ferment at the stage of dough preferably enriches the final bread flavor. In such manner, poor flavoring because of the shortened proofing time under thawing can be prevented.

For remolding or shaping after thawing, satisfactorily, the dough is taken out in predetermined timing from a thawing chamber and is then molded.

Even so-called "molded or shaped frozen dough" which has a product shape in smaller size at the stage of frozen dough, may be subjected to a process designated "pre-oven process" for arrangement with egg coating, sesame coating or topping or squeezing of mayonnaise and the like.

Additionally, a dough type with no need of proofing may also be used so that the number of the product types can be increased. For example, pies, muffins, and cake doughnuts are appropriately thawed and baked or directly baked without thawing.

For thawing and final proofing, frozen bread dough may be panned on a baking sheet (BS) with 1-inch side. The size of such BS is adjusted, depending on the volume of frozen dough. When frozen dough of a volume ½-fold the volume of a common frozen dough for the routine size of a BS is to be panned, thawed and finally proofed due to the demand at a small scale, the time required for the thawing and final proofing process of the frozen dough can be made equal to those for the routine-size dough, by using a BS of the half size.

Two or more types of dough may be panned and baked on a single BS when these types of dough belong to a single group under the same baking conditions.

Frozen bread dough is appropriately stored in a freezing chamber for storage. Frozen bread dough is stored at the mean daily ratio for use. Frozen bread dough is preferably stored from the respect of operation efficiency and simplicity, so that the types of the dough can readily be identified at readily identifiable places in the freezing chamber.

For the easiest use, individual frozen bread dough types are separately placed in individual drawer-type boxes with labels expressing the individual types. Depending on the volume and size of the frozen doughs for daily use, the drawer-type boxes should be of variable dimensions, so that the drawer-type boxes may have various types in size.

Baking is carried out by using an oven preset to fixed baking conditions. In such manner, operation efficiency and simplicity can be achieved.

By the term "fixed baking conditions", it is meant that in an oven at a constant preset baking temperature or at an actual temperature slightly different from the preset baking temperature, bread dough may immediately be placed and baked with no need of adjustment of the preset baking temperature on each baking occasion, depending on the types and volumes of the bread doughs. Thus, said term never means that the baking conditions are fixed throughout daily routine operations, but means that the oven baking conditions may be modified several times if necessary.

The fixed baking conditions include for example oven temperatures with an upper flame temperature selected from 170° C. to 230° C. and a lower flame temperature selected from 180° C. to 260° C.

Generally, each store may be equipped with two or more ovens, which are individually preset to different baking conditions, so that more types of bread can be provided. In such case, conveniently, individual bread dough types are preliminarily divided into separate groups, depending on the baking temperature and time conditions of each bread type, the type of works needed prior to or after baking (pre-oven or post-oven works), the preferential order for just fresh cooking and the preferential degree for the pre-planned production based on the leveled order.

By setting a time lag in taking out each bread dough type or each bread dough group from oven, furthermore, the baking time may be adjusted individually.

Because each bread type should be baked under appropriately adjusted conditions, some measure is required for actually baking different bread types under the fixed baking conditions, when the appropriately adjusted conditions are significantly variable among the bread types.

It is possible for example to suppress heat conduction from a lower heat source by using a BS with rivets; otherwise, it is possible to enhance heat conduction from the lower heat source by using an oven plate with holes or a BS of a small thickness.

Still furthermore, it is preferable to appropriately use an appropriate supplementary baking device.

Such supplementary baking device includes for example an upper shield plate and a lower protective sheet, as will be referenced with the invention described in Japanese Patent Application No. 296449/1998 or Japanese Patent Application No. 284066/1998.

The upper shield plate is used so as to decrease the upper thermal conductivity for baking bread types with desired suppression of coloring during baking, such as melon bread, choco-chip bread and bread with no coloring after baking (shiroyaki bread). For example, the upper shield plate includes stainless steel- or aluminium metal nets and porous metal plate, and thermally-resistant plastic fiber-made woven fabric or porous sheet made of thermally-resistant plastics such as Teflon.

The shapes and structures thereof may appropriately be designed, depending on the desired thermal shield effect. For example, the diameter and density (the product of the number of metal wires per unit area as multiplied with their diameter) of metal wire for use in the metal net or the pore ratio (opening ratio) of the porous metal plate, may be adjusted appropriately.

Still further, the distance of these upper shield plates from bread dough may appropriately be arranged, when such upper shield plates are arranged.

The lower protective sheet is used for suppressing lower thermal conduction velocity, in case that the wetness of bread dough for example for bean jam bread, pumpkin bread and soybean jam bread is desirably procured sufficiently. For example, the lower protective sheet includes metal foils such as aluminum foil and sheets made of thermally-resistant plastics such as Teflon.

In terms of the thermal conductivity of a material to be used, the sheet thickness may appropriately be adjusted.

Comparative Experiment

Comparison of bread dough types taken out of final proofing chamber from the respect of short resting time Three bread dough types, namely bean jam bread dough, curry filling doughnut and french bread boule dough, were selected as typical bread dough types among frozen bread dough types. The relation between the standby resting conditions of each bread dough type taken out of the final proofing chamber and the quality of the resulting baked product was examined.

The results in Table 1 indicate that the resulting bread was sticky when the resting temperature was too low and that the resulting bread had a hard exterior crust when the humidity was low.

When the standby resting conditions including both temperature and humidity were appropriate, alternatively, the quality of any of the resulting bread products was excellent. Importantly, the humidity was at least 60% or more.

TABLE 1

| | Temp. (° C.) | Humidity (%) | Ogura-an-pan (Resting) 1 hr | Ogura-an-pan (Resting) 3 hr | Curry filling Doughnut (Resting) 1 hr | Curry filling Doughnut (Resting) 3 hr | French bread-boule (Resting) 1 hr | French bread-boule (Resting) 3 hr |
|---|---|---|---|---|---|---|---|---|
| Case 1 | 3 | 70 | Δ | X sticky | ○ | Δ | Δ | X sticky |
| Case 2 | 8 | 50 | ○ | X Hard crust | ○ | Δ | Δ | Δ |
| | | 85 | ○ | ○ | ○ | ○ | ○ | ○ |
| Case 3 | 13 | 50 | Δ | X Hard crust | ○ | Δ | X hard crust | X hard crust |
| | | 85 | ○ | ○ | ○ | ○ | ○ | ○ |
| Case 4 | 18 | 70 | ○ | Δ | Δ | Δ | ○ | X lost shape |

○: good quality; Δ: not satisfied; X: bad quality

EXAMPLES

Supply system of just fresh-baked breads at 1000 pieces per day (in case of store opening at 10:30 and closing at 20:00)

[Equipment]

The following facilities are prepared in the store.

1. Freezing and storing chamber

The chamber at −20° C. with no temperature increase above −14° C. even during defrosting. Select such chamber of a volume larger than the volume for 2000 pieces of the bread. The chamber has drawers above 40 in number corresponding to the number of frozen bread dough types.

2. Baking Sheet (BS) and labels thereof

Prepare two sets of 40 6-portion BSs and 20 12-portion BSs. 10 of the 6-portion BSs are with rivets, while the remaining 10 BSs are with circular pores of a 2-mm diameter (pore ratio of 20%) on the bottom.

3. Dough conditioner for thawing and proofing

Prepare a routine programmed dough conditioner. The capacity corresponds to the 40 6-portion BSs and 16 of the 12-portion BSs. The dough conditioner is controllable of its temperature and humidity, and is capable of being preset with other conditions for every time.

4. Low-temperature refrigerating storage chamber for resting dough taken out of final proofing The chamber is with 24 steps and with a capacity of 2 6-portion BSs per one step. The entire capacity corresponds to 40 6-portion BSs and 16 12-portion BSs. The chamber is equipped with a freezing machine and a fan and is constantly capable of keeping 10 ° C, which can display the temperature and humidity inside the chamber with a sensor for temperature and humidity and can suppress the decrease of humidity with a spraying unit on the front portion of the fan. No heating unit is needed because the in-store temperature is assumed to be at a room temperature of 10° C. or more. Herein, any fan is acceptable.

5. Oven-and oil cooking fryer

Prepare two or more of a deck oven placing 4 6-portion BSs. The upper and lower flame temperatures may be independently adjustable, along with the heating intensity. The deck oven is equipped with a sensor and is capable of automatic heating. At least one of the two deck ovens is equipped with a steam generator for French bread.

Prepare a fryer at 170 to 200 ° C. for doughnut.

6. Personal computer (abbreviated as "PC")

Each system is mounted with a computer unit of a memory capacity of 16 MB or more, a disk drive for a combination of floppy disk and hard disk, and a laser printer. The display is satisfactorily a color display of a high resolution degree. Herein, Fujitsu Co. PC (Windows NT) is used.

Frozen Dough

Prepare 40 types of frozen bread dough as shown below in Table 2. The frozen bread dough may be prepared in a conventional manner, but the quantity of yeast depends on the dough type and the weight of a divided portion of the dough, as shown in Table 2. The quantity of yeast is expressed in part by weight (bakery %) to 100 parts by weight of wheat flour.

TABLE 2

| | Group | Kind of Bread | Shape of Dough | Weight | Yeast Content* | Notes |
|---|---|---|---|---|---|---|
| 1 | Pullman and white bread type | Raisin bread | Globe | 150 g | 5% | |
| 2 | | Danish bread pullman type | Rectangular, plate | 200 g × 2 | 4 | Folded Dough |
| 3 | Hard bread and small buns | French bread-boule | Globe | 60 | 5 | |
| 4 | | Kaiserseamein | Kaiser-shaped | 60 | 5 | |
| 5 | | Epi de bacon | Stake, bacon-folded | 150 | 5.5 | Large size |
| 6 | | Pain de seigle-boule | Globe | 100 | 5 | |
| 7 | | Pain de seigle-noix | Globe | 200 | 5.5 | Large size |
| 8 | | Pain de seigle-noix et raisin | Globe | 200 | 5.5 | Large size |
| 9 | | Pain au fromage | Ball, diced cheese inside-filled | 50 + 15 | 4.5 | |
| 10 | | Italian Focaccia | Saucer | 80 | 5 | |
| 11 | Table rolls, croissants etc. | Butter roll | Tableroll shaped | 35 | 3.5 | Small size |
| 12 | | Croissant | Straight cressent | 50 | 4 | Folded Dough |
| 13 | | mini-croissant | Straight cressent | 25 | 3.5 | Small folded dough |
| 14 | | Sesame-boule | Roll | 60 | 5 | |
| 15 | | Pain aux noix | Globe | 40 g | 5 | |
| 16 | Sweet buns | Ogura-an-pan | Circular | 45 + 35 | 5.5 | High content of sugar |
| 17 | | Koshi-an-pan | Circular | 45 + 35 | 5.5 | High content of sugar |
| 18 | | Uguiso-an-pan | Circular | 45 + 35 | 5.5 | High content of sugar |
| 19 | | Creas bun | Fork shaped | 45 + 35 | 5.5 | High content of sugar |
| 20 | | Melon bun | With biscuit dough | 45 + 30 | 5 | |
| 21 | | Kouiga-Aman | double square (all-corner folded) | 60 | 4 | |
| 22 | Doughnuts | Bean jaw doughnut | An-pan shaped | 45 + 35 | 5 | With filling |
| 23 | | Curry filling doughnut | Flat oval | 50 + 45 | 5 | With filling |
| 24 | | Frank-doughnut | Winny spiralled by card-dough | 50 + Frank | 5 | With filling |
| 25 | Topped and baked | Corn topping | Flat oval | 50 + 30 | 4.5 | Standard |
| 26 | | Two rolls dough with winny sausage | Two-rolls coupled | 35 × 2 + winny sausage | 4.5 | Standard |
| 27 | | Two rolls dough with egg-filling | Two-rolls coupled | 35 × 2 + eggs | 4.5 | Standard |
| 28 | | Tuna-filling | Flat oval | 50 + 20 | 4.5 | Standard |
| 29 | | Tuna-filling & mayonnaise topping | Flat oval | 50 + 20 | 4.5 | Standard |
| 30 | | Ham folding & mayonnaise topping | Flat oval | 50 + 10 | 4.5 | Standard |
| 31 | Danish pastry | Jam in fruits basket | Fruits basket | 50 | 4 | Folded Dough |
| 32 | | Cream in fruits basket | Fruits basket | 50 | 4 | Folded Dough |
| 33 | | Cream & fruits in fruits basket | Fruits basket | 50 | 4 | Folded Dough |
| 34 | | Cherry | Fruits basket | 50 | 4 | Folded Dough |
| 35 | | Creamy cheese | Comb | 50 | 4 | Folded Dough |
| 36 | | Chocorate | Chocorate enclosed | 50 | 4 | Folded Dough |
| 37 | | Custard cream | double square (all-corner folded) | 50 | 4 | Folded Dough |
| 38 | Pie | Apple Pie | Net top | 50 + 15 | None | |
| 39 | | Meat Pie | Triangular | 50 + 15 | None | |
| 40 | | Season's Fruits | Fruits basket oneside folded | 50 + Topping | None | |

*Bakery %

The method for producing a frozen dough type for topped and baked bread is now described as one typical example.

1. Method for producing a frozen dough type for twin-roll baked bread of 60 g (1) Blending

TABLE 3

| | Composition (part by weight) | |
|---|---|---|
| Materials | Sponge | Final kneading and mixing |
| Gluten-rich flour | 30 | 70 |
| Sugar | | 4 |
| Nonfat milk powder | | 2 |
| Salt | | 1.4 |
| Dough modifier | | 0.5 |
| Yeast | 0.5 | 4 |
| (Vitamin C) | | (1000 ppm) |
| Margarine | | 5 |
| Water | 20 | 40 |

2. Sponge process

Gluten-rich flour, yeast and water were blended together; the resulting mixture was mixed together by using a hook of a bakery's agitator at a low speed for 3 minutes and a high speed for one minute. The temperature of the resulting kneaded dough was 26° C. The resulting dough was proofed at 27° C. for 3 hours, which was used as a sponge.

3. Final kneading and mixing

The sponge and the raw materials except margarine were mixed together, similarly, at a low speed for 3 minutes, a medium speed for 2 minutes and a high speed for one minute, followed by addition of margarine; and the resulting mixture was further mixed together at a low speed for 3 minutes and a high speed for 2 minutes. After appropriate cooling, the temperature of the resulting kneaded dough was 20° C.

4. Dividing, molding and freezing

The dough was divided into 30-g portions, which were then rounded and left to rest for 15 minutes. Each portion was molded into a roll shape with a molder to a final length of 12 cm, followed by matching of two rolls and pinching of both the ends for fixing. Then, the resulting dough was frozen in a freezing chamber at −30° C. for 35 minutes.

[Operation and works]

The frozen dough is preliminarily placed in a freezing and storing chamber. Then, the number thereof for sale per day is determined. The sale estimate data based on the actual sale outcome data on the day before are used. See Table 4. Based on the table, it is calculated the total sum of the number of each merchandise per unit-time period within 3 hours (adjustable, depending on the equipment capacity and resting time). In such manner, the numbers and volume of the frozen dough to be prepared each time may be determined.

In a group of bread dough types under the same baking conditions, different bread dough types may be panned on the same BS. However, a half-size baking sheet should be used, as much as possible, when the most fresh-baked bread is desirably served at a larger number of baking frequency.

One example of the panning of frozen dough based on the estimate sale data shown in Table 4 is shown in Table 5. As described above, the panning volume and number may be determined, on the basis of the sale estimate data, but the values thereof may appropriately be modified on occasion of the basis of the actual sale outcome data. Then, a job instruction regarding the baking of the panned dough is prepared according to the aforementioned rule.

According to the instruction document, the operation is performed, so that desired fresh-baked bread types of desired numbers may be prepared in predetermined timing.

TABLE 4

| Group | # | Kind of Bread | Shape of Dough | Dividing Weight | Baking Group | Baking Time | 10:00 | 10:30 | 11:00 | 11:30 | 12:00 | 12:30 | 1:00 | 1:30 | 2:00 | 2:30 | 3:00 | 3:30 | 4:00 | 4:30 | 5:00 |
|---|---|---|---|---|---|---|---|---|---|---|---|---|---|---|---|---|---|---|---|---|---|
| Pullman and white bread type | 1 | Raisin bread | Globe | 150 g | A | 40 | 0 | 0 | 0 | 0 | 0 | 0 | 0 | 0 | 0 | 0 | 0 | 0 | 0 | 0 | 3 |
| | 2 | Danish bread pullman type | Rectangular, plate | 200 g × 2 | B | 40 | 0 | 3 | 3 | 3 | 3 | 3 | 0 | 0 | 0 | 0 | 0 | 0 | 0 | 3 | 0 |
| Hard bread and small buns | 3 | French bread-boule | Globe | 60 | C | 25 | 0 | 3 | 3 | 3 | 3 | 3 | 2 | 2 | 2 | 2 | 0 | 0 | 3 | 0 | 3 |
| | 4 | Kaisersemmeln | Kaiser-shaped | 60 | C | 25 | 0 | 3 | 3 | 3 | 3 | 3 | 0 | 0 | 0 | 0 | 0 | 0 | 0 | 3 | 0 |
| | 5 | Epi de bacon | Stake, bacon-folded | 150 | E | 30 | 0 | 2 | 0 | 2 | 0 | 0 | 2 | 2 | 2 | 0 | 0 | 2 | 0 | 0 | 0 |
| | 6 | Pain de seigle-boule | Globe | 100 | D | 30 | 0 | 0 | 0 | 0 | 0 | 0 | 0 | 0 | 0 | 0 | 0 | 0 | 0 | 2 | 2 |
| | 7 | Pain de seigle-noix | Globe | 200 | D | 30 | 0 | 2 | 0 | 0 | 0 | 2 | 2 | 2 | 2 | 2 | 2 | 0 | 2 | 2 | 2 |
| | 8 | Pain de seigle-noix et raisin | Globe | 200 | D | 30 | 0 | 0 | 0 | 0 | 0 | 0 | 0 | 0 | 2 | 0 | 2 | 0 | 2 | 0 | 0 |
| | 9 | Pain au fromage | Ball, diced cheese inside-filled | 50 + 15 | C | 30 | 0 | 0 | 0 | 0 | 3 | 0 | 2 | 0 | 0 | 0 | 0 | 0 | 3 | 0 | 3 |
| Table rolls, croissants etc. | 10 | Italian Focaccia | Saucer | 80 | E | 20 | 0 | 3 | 0 | 3 | 3 | 3 | 0 | 2 | 0 | 2 | 0 | 0 | 0 | 3 | 0 |
| | 11 | Butter roll | Tableroll shaped | 35 | F | 12 | 0 | 5 | 5 | 5 | 5 | 5 | 0 | 5 | 5 | 5 | 5 | 5 | 5 | 5 | 0 |
| | 12 | Croissant | Straight cressent | 50 | H | 15 | 0 | 0 | 0 | 0 | 0 | 0 | 5 | 5 | 5 | 5 | 5 | 5 | 0 | 0 | 5 |
| | 13 | mini-croissant | Straight cressent | 25 | H | 15 | 0 | 5 | 0 | 10 | 0 | 0 | 0 | 0 | 0 | 0 | 0 | 0 | 0 | 0 | 0 |
| | 14 | Sesame-boule | Roll | 60 | F | 10 | 0 | 0 | 0 | 0 | 0 | 0 | 2 | 2 | 2 | 2 | 2 | 0 | 3 | 0 | 3 |
| | 15 | Pain sux noix | Globe | 40 g | F | 13 | 0 | 3 | 0 | 3 | 0 | 3 | 0 | 0 | 0 | 0 | 0 | 0 | 0 | 3 | 0 |
| Sweet buns | 16 | Ogura-an-pan | Circular | 45 + 35 | J | 11 | 0 | 5 | 0 | 5 | 5 | 5 | 3 | 5 | 5 | 5 | 5 | 0 | 10 | 0 | 8 |
| | 17 | Koshi-an-pan | Circular | 45 + 35 | J | 11 | 0 | 0 | 0 | 0 | 0 | 0 | 0 | 0 | 0 | 0 | 0 | 10 | 0 | 0 | 0 |
| | 18 | Uguisu-an-pan | Circular | 45 + 35 | J | 11 | 0 | 5 | 0 | 5 | 0 | 0 | 0 | 5 | 0 | 5 | 0 | 0 | 0 | 5 | 0 |
| | 19 | Cream bun | Fork shaped | 45 + 35 | K | 12 | 0 | 3 | 0 | 3 | 0 | 3 | 2 | 2 | 2 | 2 | 0 | 0 | 3 | 0 | 3 |
| | 20 | Melon bun | With biscut dough double square (all-corner folded) | 60 | L | 18 | 0 | 3 | 0 | 3 | 0 | 3 | 0 | 0 | 0 | 0 | 0 | 0 | 0 | 0 | 3 |
| Doughnuts | 22 | Bean jam doughnut | An-pan shaped | 45 + 35 | Fry | 2 + 2 | 0 | 0 | 3 | 0 | 3 | 0 | 0 | 0 | 0 | 3 | 0 | 0 | 3 | 0 | 5 |
| | 23 | Curry filling doughnut | Flat oval | 50 + 45 | Fry | 2 + 2 | 0 | 3 | 0 | 5 | 0 | 5 | 0 | 5 | 5 | 5 | 0 | 5 | 0 | 5 | 0 |
| | 24 | Frank-doughnut | Winny spiralled by cord-dough | 50 + Frank | Fry | 2 + 2 | 0 | 2 | 2 | 0 | 4 | 0 | 4 | 0 | 6 | 2 | 2 | 0 | 5 | 0 | 5 |
| Topped and baked | 25 | Corn topping | Flat oval | 50 + 30 | G | 12 | 0 | 3 | 3 | 3 | 3 | 3 | 2 | 2 | 2 | 2 | 0 | 0 | 0 | 3 | 0 |
| | 26 | Two rolls dough with winny sausage | Two-rolls coupled | 35 × 2 + winny sausage | G | 12 | 0 | 0 | 0 | 0 | 0 | 0 | 0 | 0 | 0 | 0 | 0 | 0 | 3 | 0 | 3 |
| | 27 | Two rolls dough with egg-filling | Two-rolls coupled | 35 × 2 + eggs | G | 12 | 0 | 3 | 3 | 3 | 3 | 3 | 0 | 2 | 0 | 2 | 0 | 0 | 0 | 3 | 0 |
| | 28 | Tuna-filling | Flat oval | 50 + 20 | G | 12 | 0 | 0 | 0 | 0 | 0 | 0 | 0 | 0 | 2 | 0 | 0 | 0 | 0 | 3 | 0 |
| | 29 | Tuna-filling & mayonaise topping | Flat oval | 50 + 20 | G | 12 | 0 | 3 | 3 | 3 | 3 | 3 | 0 | 2 | 0 | 2 | 0 | 0 | 3 | 0 | 3 |
| | 30 | Ham folding & mayonaise topping | Flat oval | 50 + 10 | G | 12 | 0 | 0 | 0 | 0 | 0 | 0 | 0 | 0 | 0 | 2 | 0 | 0 | 0 | 3 | 0 |
| Danish pastry | 31 | Jam in fruit basket | Fruits basket | 50 | I | 15 | 0 | 3 | 3 | 3 | 3 | 3 | 2 | 2 | 2 | 2 | 0 | 0 | 0 | 3 | 0 |
| | 32 | Cream in fruits basket | Fruits basket | 50 | I | 15 | 0 | 0 | 0 | 0 | 0 | 0 | 2 | 0 | 2 | 0 | 0 | 0 | 3 | 0 | 3 |
| | 33 | Cream & fruits in fruits basket | Fruits basket | 50 | I | 15 | 0 | 3 | 3 | 3 | 3 | 3 | 0 | 2 | 0 | 2 | 0 | 0 | 0 | 3 | 0 |
| | 34 | Cherry | Fruits basket | 50 | I | 15 | 0 | 3 | 3 | 3 | 3 | 3 | 0 | 2 | 0 | 2 | 0 | 0 | 3 | 0 | 3 |
| | 35 | Creamy cheese | Comb | 50 | I | 15 | 0 | 3 | 3 | 3 | 3 | 3 | 2 | 2 | 2 | 2 | 0 | 0 | 0 | 3 | 0 |
| | 36 | Chocorate | Chocorate enclosed double square (all-corner folded) | 50 | I | 12 | 0 | 3 | 3 | 3 | 3 | 3 | 0 | 0 | 0 | 2 | 0 | 0 | 3 | 0 | 3 |
| | 37 | Custard cream | | 50 | I | 12 | 0 | 3 | 0 | 3 | 3 | 3 | 2 | 2 | 2 | 2 | 0 | 0 | 3 | 0 | 3 |
| Pie | 38 | Apple Pie | Flat top | 50 + 15 | M | 15 | 0 | 0 | 0 | 0 | 0 | 0 | 2 | 2 | 0 | 0 | 0 | 0 | 3 | 0 | 3 |
| | 39 | Meat Pie | Triangular | 50 + 15 | M | 15 | 0 | 3 | 3 | 3 | 3 | 3 | 2 | 2 | 2 | 2 | 0 | 0 | 0 | 3 | 0 |

TABLE 4-continued

| | | | | | Baking | | | | | | | | | | Charge Amount | | |
|---|---|---|---|---|---|---|---|---|---|---|---|---|---|---|---|---|---|
| | Group | Kind of Bread | Shape of Dough | Dividing Weight | Group | Time | 5:30 | 6:00 | 6:30 | 7:00 | 7:30 | 8:00 | Total | 1st | 2nd | 3rd |
| | Total | | | | | | 74 | 36 | 59 | 36 | 64 | 16 | 30 | 55 | 77 | 55 |
| 1 | Pullman and | Raisin bread | Globe | 150 g | A | 40 | 0 | 3 | 0 | 0 | 0 | 0 | 19 | 8 | 5 | 6 |
| 2 | white bread type | Danish bread pullman type | Rectangular, plate | 200 g × 2 | B | 40 | 3 | 0 | 3 | 0 | 0 | 0 | 22 | 9 | 4 | 9 |
| 3 | Hard bread and | French bread-boule | Globe | 60 | C | 25 | 3 | 3 | 0 | 0 | 0 | 0 | 19 | 8 | 5 | 6 |
| 4 | small buns | Kaisersemmeln | Kaiser-shaped | 60 | C | 25 | 3 | 0 | 3 | 0 | 0 | 0 | 22 | 9 | 4 | 9 |
| 5 | | Epi de bacon | Stake, bacon-folded | 150 | E | 30 | 0 | 0 | 0 | 0 | 0 | 0 | 6 | 2 | 4 | 0 |
| 6 | | Pain de seigle-boule | Globe | 100 | D | 30 | 2 | 2 | 0 | 0 | 0 | 0 | 12 | 4 | 2 | 6 |
| 7 | | Pain de seigle-noix | Globe | 200 | D | 30 | 0 | 0 | 2 | 0 | 0 | | 10 | 4 | 2 | 4 |
| 8 | | Pain de seigle-noix et raisin | Globe | 200 | D | 30 | 2 | 2 | 0 | 0 | 0 | 0 | 12 | 4 | 2 | 6 |
| 9 | | Pain au fromage | Ball, diced cheese inside-filled | 50 + 15 | C | 30 | 0 | 3 | 0 | 0 | 0 | 0 | 19 | 8 | 5 | 6 |
| 10 | | Italian Focaccia | Saucer | 80 | E | 20 | 3 | 0 | 3 | 0 | 0 | 0 | 22 | 9 | 4 | 9 |
| 11 | Table rolls, | Butter roll | Tableroll shaped | 35 | F | 12 | 5 | 0 | 2 | 0 | 3 | 0 | 45 | 15 | 15 | 15 |
| 12 | croissants etc. | Croissant | Straight cressent | 50 | H | 15 | 0 | 5 | 0 | 5 | 0 | 3 | 48 | 15 | 15 | 18 |
| 13 | | mini-croissant | Straight cressent | 25 | H | 15 | 10 | 0 | 5 | 0 | 5 | 0 | 60 | 20 | 15 | 25 |
| 14 | | Sesame-boule | Roll | 60 | F | 10 | 3 | 0 | 3 | 0 | 0 | 0 | 19 | 8 | 5 | 6 |
| 15 | | Pain sux noix | Globe | 40 g | F | 13 | 3 | 0 | 3 | 0 | 0 | 0 | 22 | 9 | 4 | 9 |
| 16 | Sweet buns | Ogura-an-pan | Circular | 45 + 35 | J | 11 | 0 | 5 | 0 | 5 | 0 | 0 | 51 | 13 | 20 | 18 |
| 17 | | Koshi-an-pan | Circular | 45 + 35 | J | 11 | 5 | 0 | 2 | 0 | 0 | 0 | 45 | 13 | 20 | 12 |
| 18 | | Uguisu-an-pan | Circular | 45 + 35 | J | 11 | 3 | 0 | 3 | 0 | 0 | 0 | 22 | 9 | 4 | 9 |
| 19 | | Cream bun | Fork shaped | 45 + 35 | K | 12 | 0 | 3 | 0 | 3 | 0 | 0 | 22 | 9 | 4 | 9 |
| 20 | | Melon bun | With biscuit dough | 60 | L | 14 | 3 | 0 | 3 | 0 | 0 | 0 | 19 | 8 | 5 | 6 |
| 21 | | Kouign-Aman | double square (all-corner folded) | 50 + 15 | L | 18 | 3 | 0 | 3 | 0 | 0 | 0 | 22 | 9 | 4 | 9 |
| 22 | Doughnuts | Bean jam doughnut | An-pan shaped | 45 + 35 | Fry | 2 + 2 | 0 | 5 | 0 | 3 | 3 | 0 | 25 | 6 | 6 | 13 |
| 23 | | Curry filling doughnut | Flat oval | 50 + 45 | Fry | 2 + 2 | 5 | 0 | 8 | 0 | 3 | 0 | 47 | 13 | 15 | 19 |
| 24 | | Frank-doughnut | Winny spiralled by cord-dough | 50 + Frank | Fry | 2 + 2 | 0 | 5 | 0 | 2 | 2 | 0 | 41 | 12 | 15 | 14 |
| 25 | Topped and baked | Corn topping | Flat oval | 50 + 30 | G | 12 | 3 | 0 | 3 | 0 | 0 | 0 | 22 | 9 | 4 | 9 |
| 26 | | Two rolls dough with winny sausage | Two-rolls coupled | 35 × 2 + winny sausage | G | 12 | 0 | 3 | 0 | 0 | 0 | 0 | 19 | 8 | 5 | 6 |
| 27 | | Two rolls dough with egg-filling | Two-rolls coupled | 35 × 2 + eggs | G | 12 | 3 | 0 | 1 | 0 | 0 | 0 | 20 | 9 | 4 | 7 |
| 28 | | Tuna-filling | Flat oval | 50 + 20 | G | 12 | 3 | 0 | 1 | 0 | 0 | 0 | 20 | 9 | 4 | 7 |
| 29 | | Tuna-filling & mayonaise topping | Flat oval | 50 + 20 | G | 12 | 0 | 3 | 0 | 0 | 0 | 0 | 19 | 8 | 5 | 6 |
| 30 | | Ham folding & mayonaise topping | Flat oval | 50 + 10 | G | 12 | 3 | 0 | 3 | 0 | 0 | 0 | 22 | 9 | 4 | 9 |
| 31 | Danish pastry | Jam in fruit basket | Fruits basket | 50 | I | 15 | 3 | 0 | 3 | 0 | 0 | 3 | 25 | 9 | 4 | 12 |
| 32 | | Cream in fruits basket | Fruits basket | 50 | I | 15 | 0 | 3 | 0 | 3 | 0 | 0 | 19 | 8 | 5 | 6 |
| 33 | | Cream & fruits in fruits basket | Fruits basket | 50 | I | 15 | 3 | 0 | 3 | 0 | 0 | 3 | 25 | 9 | 4 | 12 |
| 34 | | Cherry | Fruits basket | 50 | I | 15 | 0 | 3 | 0 | 0 | 0 | 0 | 19 | 8 | 5 | 6 |
| 35 | | Creamy cheese | Comb | 50 | I | 15 | 3 | 0 | 3 | 0 | 0 | 3 | 22 | 8 | 5 | 9 |

TABLE 4-continued

| | | | | | | | | | | | | | |
|---|---|---|---|---|---|---|---|---|---|---|---|---|---|
| 36 | Chocorate | Chocorate enclosed double square (all-corner folded) | 50 | I | 12 | 3 | 0 | 3 | 0 | 0 | 0 | 22 | 9 | 4 | 9 |
| 37 | Custard cream | | 50 | I | 12 | 3 | 0 | 3 | 0 | 0 | 3 | 25 | 9 | 4 | 12 |
| 38 | Pie Apple Pie | Flat top | 50 + 15 | M | 15 | 0 | 3 | 0 | 0 | 0 | 0 | 19 | 8 | 5 | 6 |
| 39 | Meat Pie | Triangular | 50 + 15 | M | 15 | 3 | 0 | 3 | 0 | 0 | 3 | 25 | 9 | 4 | 12 |
| 40 | Season's Fruits | Fruits basket oneside folded | 50 + topping | M | 15 | 3 | 0 | 0 | 0 | 3 | 0 | 26 | 9 | 9 | 8 |
| | | | | | | | | | | | | 0 | 0 | 0 | 0 |
| | Total | | | | 86 | 52 | 60 | 12 | 19 | 18 | 1000 | 361 | 260 | 379 |

TABLE 5

| Group | Kind of Bread | Shape of Dough | Dividing Weight | Baking Group | Baking Time | Baking Total | 1st Charge | 1st Total | Baking Sheet (BS) Kind | Baking Sheet Number | 2nd Charge | 2nd Total | 2nd BS Number | 3rd Charge | 3rd Total | 3rd BS Number |
|---|---|---|---|---|---|---|---|---|---|---|---|---|---|---|---|---|
| 1 Pullman and white bread type | Raisin bread | Globe | 150 g | A | 40 | 19 | 8 | 8 | Pullmann | 8 | 5 | 5 | 5 | 6 | 6 | 6 |
| 2 | Danish bread pullman type | Rectangular, plate | 200 g × 2 | B | 40 | 22 | 9 | 9 | Pullmann | 9 | 4 | 4 | 4 | 9 | 9 | 9 |
| 3 Hard bread and small buns | French bread-boule | Globe | 60 | C | 25 | 19 | 8 | | | | 5 | | | 6 | 9 | 9 |
| 4 | Kaisersemmeln | Kaiser-shaped | 60 | C | 25 | 22 | 9 | 25 | with holes | 3 + ½ | 4 | 14 | 2 | 9 | 21 | 3 |
| 9 | Pain au fromage | Ball diced cheese inside-filled | 50 + 15 | C | 30 | 19 | 8 | | | | 5 | | | 6 | | | |
| 6 | Pain de seigle-boule | Globe | 100 | D | 30 | 12 | 4 | | | | 2 | | | 6 | | | |
| 7 | Pain de seigle-noix | Globe | 200 | D | 30 | 10 | 2 | 10 | with holes | 3 | 4 | 8 | 2 | 4 | 16 | 4 |
| 8 | Pain de seigle-noix et raisin | Globe | 200 | D | 30 | 12 | 4 | | | | 2 | | | 6 | | | |
| 5 | Epi de bacon | Stake, bacon-folded | 150 | D | 30 | 6 | 2 | | | | 4 | | | 0 | | | |
| 10 | Italian Focaccia | Saucer | 80 | E | 20 | 22 | 9 | 11 | Standard | 3 | 4 | 8 | 2 | 9 | 9 | 4 + ½ |
| 11 Table rolls, croissants etc. | Butter roll | Tableroll shaped | 35 | E | 12 | 45 | 15 | 32 | Standard | 4 | 15 | 24 | 3 | 15 | 30 | 4 |
| 14 | Sesame-boule | Roll | 60 | F | 10 | 19 | 8 | | | | 5 | | | 6 | | | |
| 15 | Pain aux noix | Globe | 40 g | F | 13 | 22 | 9 | | | | 4 | | | 9 | | | |
| 25 Topped and baked | Corn topping | Flat oval | 50 + 30 | F | 12 | 22 | 9 | | | | 4 | | | 9 | | | |
| 26 | Two rolls dough with winny sausage | Two-rolls coupled | 35 × 2 + winny sausage | G | 12 | 19 | 8 | | | | 5 | | | 6 | | | |
| 27 | Two rolls dough with egg-filling | Two-rolls coupled | 35 × 2 + eggs | G | 12 | 20 | 9 | | | | 4 | | | 7 | | | |
| 28 | Tuna-filling | Flat oval | 50 + 20 | G | 12 | 20 | 9 | 52 | Standard | 6 + ½ | 4 | 26 | 3 + ½ | 7 | 44 | 5 + ½ |
| 29 | Tuna-filling & mayonnaise topping | Flat oval | 50 + 20 | G | 12 | 19 | 8 | | | | 5 | | | 6 | | | |
| 30 | Ham folding & mayonnaise topping | Flat oval | 50 + 10 | G | 12 | 22 | 9 | | | | 4 | | | 9 | | | |
| 12 Table rolls, croissant etc. | Croissant | Straight cressent | 50 | H | 15 | 48 | 15 | 35 | Standard | 4 | 15 | 30 | 3 | 18 | 43 | 5 |
| 13 | mini-croissant | Straight cressent | 25 | H | 15 | 60 | 20 | | | | 15 | | | 25 | | | |
| 31 Danish pastry | Jam in fruits basket | Fruits basket | 50 | I | 15 | 25 | 9 | | | | 4 | | | 12 | | | |
| 32 | Cream in fruits basket | Fruits basket | 50 | I | 15 | 19 | 8 | | | | 5 | | | 6 | | | |
| 33 | Cream & fruits in fruits basket | Fruits basket | 50 | I | 15 | 25 | 9 | 61 | Standard | 8 | 4 | 30 | 4 | 12 | 66 | 8 + ½ |
| 34 | Cherry | Comb | 50 | I | 15 | 19 | 9 | | | | 4 | | | 6 | | | |
| 35 | Creamy cheese | Chocorate enclosed double square | 50 | I | 15 | 22 | 8 | | | | 5 | | | 9 | | | |
| 36 | Chocorate | | 50 | I | 15 | 22 | 9 | | | | 4 | | | 9 | | | |
| 37 | Custard cream | (all-corner folded) | 50 | I | 12 | 25 | 9 | | | | 4 | | | 12 | | | |
| 16 Sweet buns | Ogura-an-pan | Circular | 45 + 35 | J | 11 | 51 | 13 | 44 | with ribets | 5 + ½ | 20 | 48 | 6 | 18 | 39 | 5 |
| 17 | Koshi-an-pan | Circular | 45 + 35 | J | 11 | 45 | 13 | | | | 20 | | | 12 | | | |
| 18 | Uguisu-an-pan | Circular | 45 + 35 | J | 11 | 22 | 9 | | | | 4 | | | 9 | | | |
| 19 | Cream bun | Fork shaped | 45 + 35 | J | 12 | 22 | 9 | | | | 5 | | | 9 | | | |
| 20 | Melon bun | With biscuit dough | 45 + 30 | K | 14 | 19 | 8 | 8 | Standard | 2 | 5 | 5 | 1 + ½ | 6 | 6 | 1 |
| 21 | Kouign-Aman | double square (all-corner folded) | 60 | L | 18 | 22 | 9 | 9 | Standard | 1 + ½ | 4 | 4 | | 9 | 9 | 1 + ½ |
| 22 Doughnuts | Bean jam doughnut | An-pan shaped | 45 + 35 | fry | 2 + 2 | 25 | 6 | | | | 6 | | | 13 | | | |
| 23 | Curry filling doughnut | Flat oval | 50 + 45 | fry | 2 + 2 | 47 | 13 | 31 | Thaving | 4 | 15 | 36 | 5 | 19 | 46 | 6 |
| 24 | Frank-doughnut | Winny spiralled by cord-dough | 50 + Frank | fry | 2 + 2 | 41 | 12 | | | | 15 | | | 14 | | | |
| 38 Pie | Apple Pie | Net top | 50 + 15 | M | 15 | 19 | 8 | | | | 5 | | | 6 | | | |

TABLE 5-continued

| Group | Kind of Bread | Shape of Dough | Dividing Weight | Baking Group | Baking Time | Baking Total | 1st Charge | 1st Number Total | Baking Sheet (BS) Kind | Baking Sheet (BS) Number | 2nd Charge | 2nd Number Total | 2nd BS Number | 3rd Charge | 3rd Number Total | BS Number |
|---|---|---|---|---|---|---|---|---|---|---|---|---|---|---|---|---|
| 39 | Meat Pie | Triangular | 50 + 15 | M | 15 | 25 | 9 | 26 | Standard | 3 + ½ | 4 | 18 | 2 + ½ | 12 | 26 | 3 + ½ |
| 40 | Season's Fruits | Fruits basket oneside folded | 50 + toppings | M | 15 | 26 | 9 | | | | 9 | | | 8 | | |
| | Total | | | | | 1000 | 0 | 361 | | | 0 | 260 | | 0 | 379 | |

Presetting of the Operation Conditions of Individual Units

The operation conditions of dough conditioner, standby storage chamber (refrigerating and storing chamber) of dough taken out of the final proofing chamber, oven and fryer were as follows according to time schedule.

Further, individual baking groups and BS expression examples are shown in Table 6. The baking group "L" in Table 6 means that bread dough placed in a buns round bread mold of a 10-cm diameter is baked on a BS.

Thawing and Final Proofing Process

During thawing, the temperature inside the chamber was 10° C. with a humidity of 50% RH; then, the temperature was raised at a rate of 0.25° C./minute to 30° C., 80 minutes later, while keeping the humidity at 50% RH. Thereafter, the chamber was set at a temperature of 30° C. and a humidity of 80% RH for 100 minutes. The total time required for the thawing and final proofing process was 3 hours. Resting chamber (refrigerating storage chamber) at a temperature of 10° C. and a humidity of 80%

Oven 1: upper flame temperature of 190° C./220° C.
Oven 2: upper flame temperature of 200° C./200° C.
Fryer: 190° C.

TABLE 6

Baking Groups and Labels

| | Baking Group | Label | Colors | Series | Use of Steam |
|---|---|---|---|---|---|
| Oven ① 190°/220° | A | Pullman & white bread type | Red | Red series | |
| | B | Danish bread | Pale brown | | |
| | C | French bread | Reddish orange | | Yes |
| | D | Pain de seigle-boule | Pink | | Yes |
| | E | Epi, etc. | Orange | | Yes |
| Oven ② 200°/200° | F | Table rolls | Green | Blue series | |
| | G | Topped and baked | Blue | | |
| | H | Croissant | Sky blue | | |
| | I | Danish pastry | Yellow green | | |
| | J | An-pan | Sea green | | |
| | K | Melon bun | Pale green | | |
| | L | Kouiga-Aman | Purple | | |
| | M | Pie | Dark | | |
| Fryer | Fry | Doughnut | Black | Black | |

According to the present method, numerous types of just fresh-baked bread and fried doughnut of stable quality can be prepared, constantly, with a labor-saving simple operation in a space-saving manner.

According to the present system, the numbers and volume to be prepared can be controlled by automatically catching the change of actual sale outcome over time under computer control. The increase or decrease of an additionally prepared numbers and volume of bread dough attains loss reduction.

Because the oven preset temperature is preliminarily fixed to a predetermined temperature under the estimation as to when each bread type is to be taken out of final proofing chamber, the oven temperature and bread type are not any more required to be examined and checked, so simple works with no need of skillful workers are only required for baking.

According to the present system, further, all the information concerning the contents of works and timings thereof can be instantly caught and given as job instruction to workers, and therefore, not specialist workers but even part-time workers can perform the works once the part-time workers understand and master essential manuals therefor. Accordingly, just fresh-cooked food products of excellent quality can be supplied.

Since the labor of the workers and the timing for the occurrence of works can be controlled through planned works based on the job instruction, a kitchen job with the minimum number of workers required for the job can readily be realized.

Figure 11:
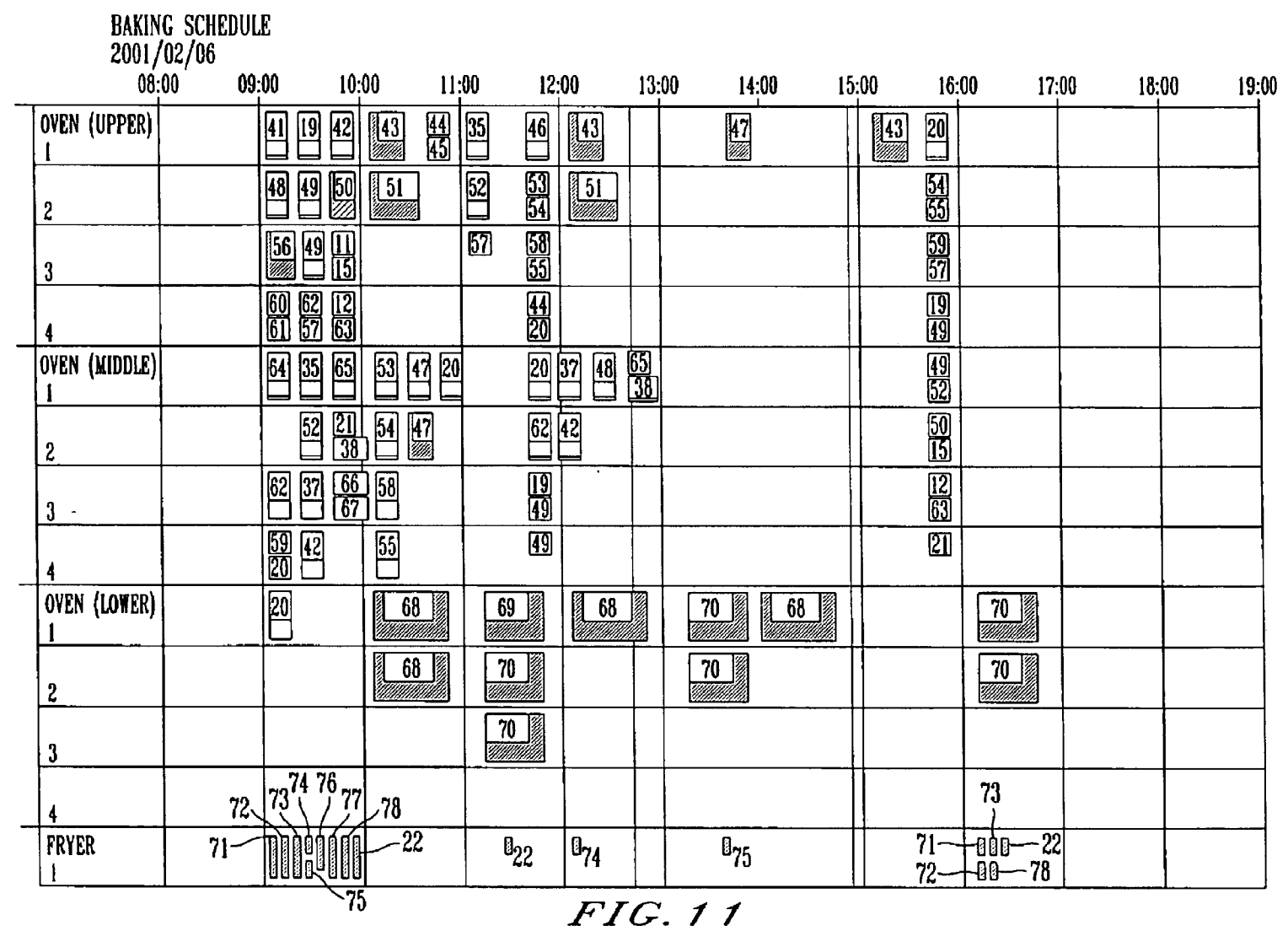
Figure 12:
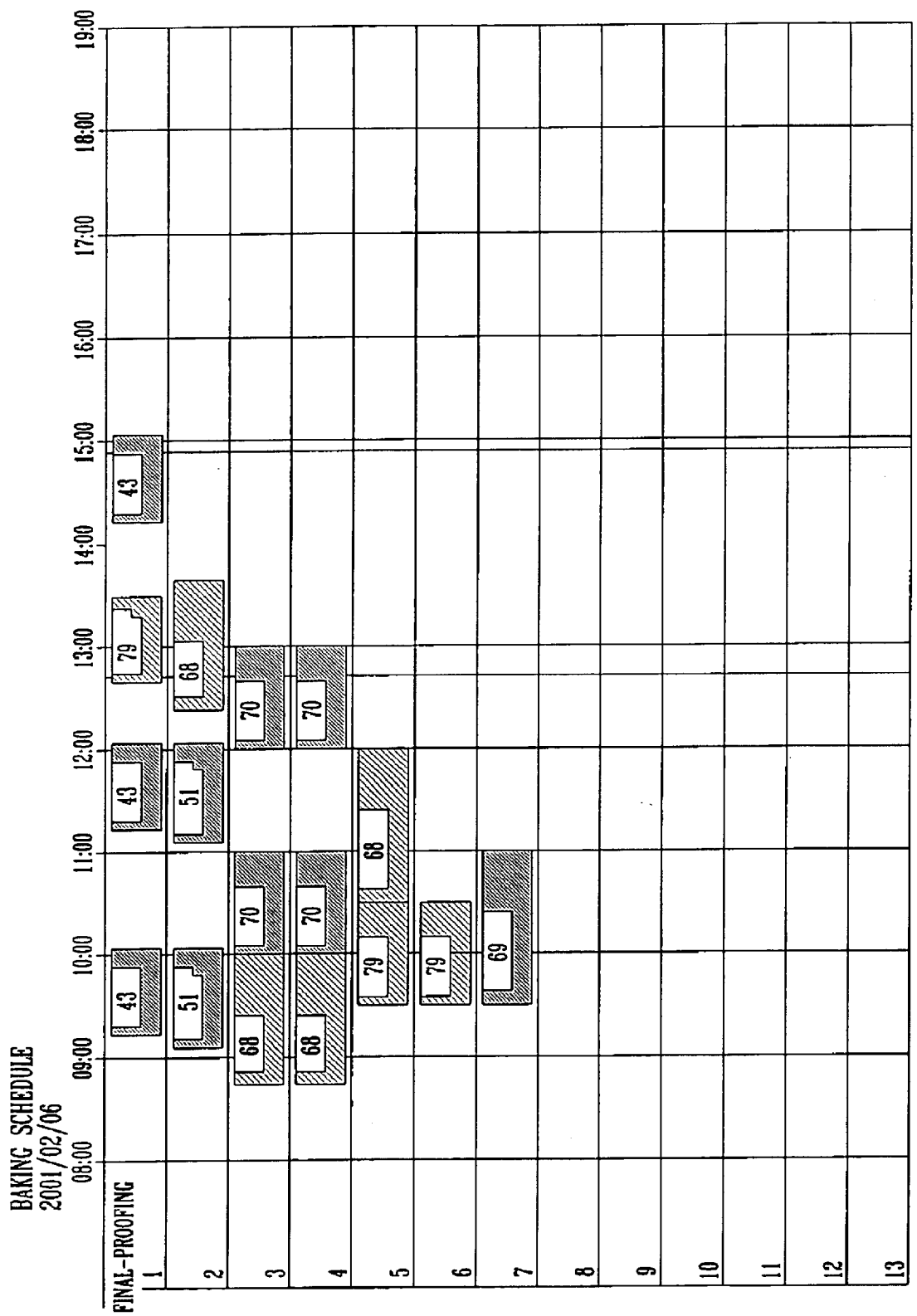
FIG. 12 depicts one example of the job schedule output from the job instruction system.
Figure 13:
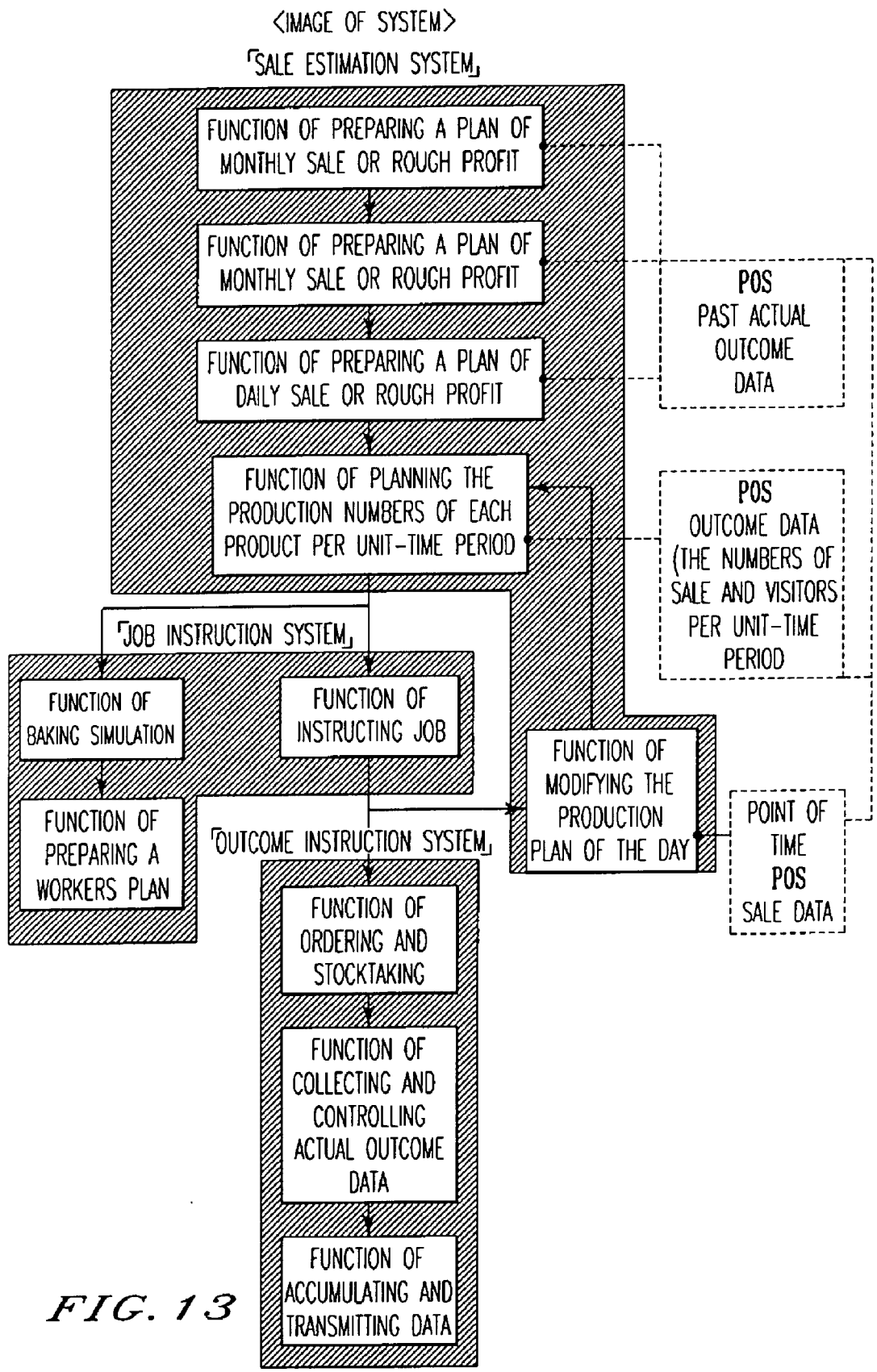
FIG. 13 depicts one example of the flow chart showing actual functions of the present system. Each function described in the flow chart is as follows.

| Kind of Products shown in FIG. 11 & FIG. 12 | |
|---|---|
| 41 | Mini-bacon-epi |
| 42 | Chocolate nut |
| 43 | Garlic-France |
| 44 | Potato-mayonnaise pizza with fish-egg |
| 45 | Misch-brot |
| 46 | Cheese stick |
| 47 | Raisin-bread |
| 48 | Milky France |
| 49 | Hokkaido bean jam bun |
| 50 | Carrot-roll |
| 51 | Ficelle old Fashion |
| 52 | Chocolate-almond |
| 53 | German potato |
| 54 | Frank roll |
| 55 | Vegetable pizza |
| 56 | Walnut & Dryfig |
| 57 | Milky soft bread |
| 58 | Corn roll |
| 59 | With sliced bacon and vegetables |
| 60 | Sesame roll |
| 61 | Graham-rolls |
| 62 | Whipped cream melon |
| 63 | Blueberry |
| 64 | Cheese stick |
| 65 | Chocolate-chip |
| 66 | Plane muffin |
| 67 | Chocolate muffin |
| 68 | English bread |
| 69 | Calpis Butter bread |
| 70 | White Bread |
| 71 | Frank-doughnut |
| 72 | Winter season curry doughnut |
| 73 | Curry filling doughnut |
| 74 | Egg filling doughnut |
| 75 | Fried ball |
| 76 | Whipped choco-cream doughnut |
| 77 | Cinnamon bagel |
| 78 | Twisted doughnut |
| 79 | Raisin-enriched |

What is claimed as new and is desired to be secured as Letters Patent of the United States is:

1. A method for producing and supplying just fresh-baked bread using frozen bread doughs, comprising:

subjecting a quantity of the frozen bread doughs necessary for types of bread and number of breads to be consumed per a unit-time period to a thawing and a final proofing process, wherein the subjecting operation includes continuously carrying out the thawing process and the final proofing process of frozen bread doughs in a dough conditioner by raising an inner temperature of the dough conditioner from an initial temperature to a range of 17° C. to 40° C. at a raising rate of 0.1° C./min to 2° C./min while maintaining a difference between a dew point in the dough conditioner and a temperature on a bread surface to be within 20° C., and after the completion of the final proofing, lowering the inner temperature of the dough conditioner to a range of 5° C. to 15° C. at least at a lowering rate of 0.2° C./min while maintaining the difference between a dew point in the dough conditioner and a temperature on bread surface to be within at most 20° C;

resting, after the thawings and final proofing process, the bread doughs in a standby mode at a temperature of 5° C. to 15° C. and a relative humidity of 60% to 98% in the same dough conditioner; and baking, after the resting, at least a part of the bread doughs rested in the standby mode in ovens under fixed baking conditions, wherein the baking includes presetting fixed baking conditions of the ovens at an upper flame temperature selected from 170° C. to 230° C. and a lower flame temperature selected from 180° C. to 260° C.

2. A method for producing and supplying just fresh-fried doughnuts using frozen bread doughs, comprising:

subjecting a quantity of frozen bread dough necessary for types of doughnut and number of doughnuts to be consumed per a unit-time period to a thawing and final proofing process, wherein the subjecting operation includes continuously carrying out the thawing process and the final proofing process of frozen bread doughs in a dough conditioner by raising an inner temperature of the dough conditioner from an initial temperature to a range of 17° C. to 40° C. at a raising rate of 0.1° C./min to 2° C/min while maintaining a difference between a dew point in the dough conditioner and a temperature on a bread surface to be within 20° C. and after the completion of the final proofing lowering the inner temperature of the dough conditioner to a range of 5° C. to 15° C. at least at a lowering rate of 0.2° C./min while maintaining the difference between a dew point in the dough conditioner and a temperature on bread surface to be within at most 20° C;

resting, after the thawing and final proofing process, the bread doughs in a standby mode at a temperature of 5° C. to 15° C. and a relative humidity of 60% to 98% in the same dough conditioner; and after the resting, at least one of baking in ovens under fixed baking conditions or cooking with an oil fryer at least a part of the bread doughs rested in the standby mode.

3. A method according to any one of claim 1 or 2, wherein the unit-time period is one hour to 4 hours.

4. A method according to any one of claim 1 or 2, wherein the subjecting operation includes placing the quantity of frozen bread dough in at least two dough conditioners and operating the dough conditioners at operation cycles with a time lag.

5. A method according to any one of claim 1 or 2, wherein total times required for thawing and proofing several types of frozen bread dough are made equal by modifying an amount of yeast to be added per each bread dough.

\* \* \* \* \*